United States Patent
Kim et al.

(10) Patent No.: US 11,653,403 B2
(45) Date of Patent: May 16, 2023

(54) METHOD FOR PERFORMING, BY TERMINAL, PDU SESSION ESTABLISHMENT REQUEST WHEN INFORMATION ON LADN AREA HAS CHANGED

(71) Applicant: LG Electronics Inc., Seoul (KR)

(72) Inventors: Jaehyun Kim, Seoul (KR); Sangmin Park, Seoul (KR); Hyunsook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 146 days.

(21) Appl. No.: 17/257,554

(22) PCT Filed: Jun. 19, 2019

(86) PCT No.: PCT/KR2019/007365
§ 371 (c)(1),
(2) Date: Dec. 31, 2020

(87) PCT Pub. No.: WO2020/013468
PCT Pub. Date: Jan. 16, 2020

(65) Prior Publication Data
US 2021/0307101 A1    Sep. 30, 2021

(30) Foreign Application Priority Data

Jul. 10, 2018 (KR) .................. 10-2018-0079816

(51) Int. Cl.
*H04W 76/18* (2018.01)
*H04W 60/00* (2009.01)
*H04W 84/12* (2009.01)

(52) U.S. Cl.
CPC .......... *H04W 76/18* (2018.02); *H04W 60/00* (2013.01); *H04W 84/12* (2013.01)

(58) Field of Classification Search
CPC ..... H04W 76/18; H04W 60/00; H04W 84/12; H04W 8/06; H04W 76/12; H04W 48/02
See application file for complete search history.

(56) References Cited

U.S. PATENT DOCUMENTS 6,097,817 A * 8/2000 Bilgic .................. H04L 63/08
455/410
2018/0192471 A1   7/2018 Li et al.
(Continued)

FOREIGN PATENT DOCUMENTS

WO    WO2017095809    6/2017

OTHER PUBLICATIONS

3rd Generation Partnership Project; Technical Specification Group Services and System Aspects, "Procedures for the 5G System; Stage 2 (Release 15)," 3GPP TS 23.502, v15.2.0, Jun. 2018, 310 pages.
(Continued)

*Primary Examiner* — Marisol Figueroa
(74) *Attorney, Agent, or Firm* — Fish & Richardson P.C.

(57) ABSTRACT

In order to achieve the above-described object, a disclosure of this specification provides a method for performing, by a UE, a PDU session establishment request, in case information on a LADN area is changed. The method may include the steps of performing a first PDU session establishment request for a first LADN area, in case the first PDU session establishment request is transmitted from outside of the first LADN area, receiving a Reject message rejecting the first PDU session establishment request from a network system, in case the Reject message is received, transmitting a registration update request for updating a LADN area to the network system, receiving information on an updated second LADN area (LADN Service Area 2) as a response to the registration update request, and performing a second PDU session establishment request for the second LADN area.

8 Claims, 26 Drawing Sheets

(56) References Cited

U.S. PATENT DOCUMENTS

2019/0116486 A1* 4/2019 Kim .................. H04W 8/10
2019/0174449 A1* 6/2019 Shan ................. H04W 60/00
2019/0313358 A1* 10/2019 Lee .................. H04W 4/70

OTHER PUBLICATIONS

LG Electronics, "Clarification on LADN DNN(s) configured in AMF," S2-186508, 3GPP TSG-SA WG2 Meeting #128, Vilnius, Lithuania, Jul. 2-Jul. 6, 2018, 5 pages.
Samsung, Huawei, LG Electronics, "Clarification on LADN," S2-186427, 3GPP TSG SA WG2 Meeting #128, Vilnius, Lithuania, Jul. 2-Jul. 6, 2018, 5 pages.

* cited by examiner

METHOD FOR PERFORMING, BY TERMINAL, PDU SESSION ESTABLISHMENT REQUEST WHEN INFORMATION ON LADN AREA HAS CHANGED

CROSS-REFERENCE TO RELATED APPLICATIONS

This application is a National Stage application under 35 U.S.C. § 371 of International Application No. PCT/KR2019/007365, filed on Jun. 19, 2019, which claims the benefit of Korean Patent Application No. 10-2018-0079816 filed on Jul. 10, 2018. The disclosures of the prior applications are incorporated by reference in their entirety.

BACKGROUND OF THE DISCLOSURE

Field of the Disclosure

The present disclosure relates to next generation mobile communication.

Related Art

In order to respond to various forums and new technologies related to the fourth ($4^{th}$) generation mobile communication, 3GPP, which establishes the technology standard of mobile communication systems, has initiated research on the Long Term Evolution/System Architecture Evolution (LTE/SAE) technology as part of its effort to optimize and enhance capabilities of the 3GPP technologies, since the end of year 2004.

The SAE, which has been performed based on 3GPP SA WG2, is a research regarding network technology that aims to determine the structure of a network and to support mobility between heterogeneous networks in line with an LTE task of a 3GPP TSG RAN and is one of the most recent important standardization issues of 3GPP. The SAE is a task for developing the 3GPP system into a system that supports various radio access technologies based on an IP, and the task has been carried out for the purpose of an optimized packet-based system, which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows an exemplary architecture of an evolved mobile communication network.

An Evolved Packet Core (EPC) may include various elements. FIG. 1 illustrates a Serving Gateway (S-GW) (52), a Packet Data Network Gateway (PDN GW) (53), a Mobility Management Entity (MME) (51), a Serving General Packet Radio Service (GPRS) Supporting Node (SGSN), and an enhanced Packet Data Gateway (ePDG) that correspond to some of the various elements.

The S-GW (52) is an element that operates at a boundary point between a Radio Access Network (RAN) and a core network and has a function of maintaining a data path between an eNodeB (22) and the PDN GW (53). Furthermore, if a user equipment (UE) moves in a region in which service is provided by the eNodeB (22), the S-GW (52) plays a role of a local mobility anchor point. That is, for mobility within an E-UTRAN (i.e., a Universal Mobile Telecommunications System (Evolved-UMTS) Terrestrial Radio Access Network defined after 3GPP Release-8), packets can be routed through the S-GW (52). Furthermore, the S-GW (52) may play a role of an anchor point for mobility with another 3GPP network (i.e., a RAN defined prior to 3GPP Release-8, e.g., a UTRAN or Global System for Mobile communication (GSM) (GERAN)/Enhanced Data rates for Global Evolution (EDGE) Radio Access Network).

The PDN GW (or P-GW) (53) corresponds to the termination point of a data interface toward a packet data network. The PDN GW (53) can support policy enforcement features, packet filtering, charging support, and so on. Furthermore, the PDN GW (or P-GW) (53) can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW (52) and the PDN GW (53) have been illustrated as being separate gateways, but the two gateways may be implemented in accordance with a single gateway configuration option.

The MME (51) is an element for performing the access of a terminal to a network connection and signaling and control functions for supporting the allocation, tracking, paging, roaming, handover, and so on, of network resources. The MME (51) controls control plane functions related to subscribers and session management. The MME (51) manages numerous eNodeBs (22) and performs conventional signaling for selecting a gateway for handover to another 2G/3G networks. Furthermore, the MME (51) performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U, S1-MME, and so on). In a 3GPP system, a conceptual link that connects two functions being present in the different function entities of an E-UTRAN and an EPC is defined as a reference point. Table 1 below describes the reference points shown in FIG. 1. In addition to the reference points shown in the example of Table 1, various reference points may be present depending on the network configuration.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in Idle and/or active state. This reference point can be used intra-PLMN or inter-PLMN |

TABLE 1-continued

| Reference point | Description |
|---|---|
| | (e.g., in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between MME and SGW |
| SGi | It is the reference point between the PDN GW and the packet data network. Packet data network may be an operator external public or private packet data network or an intra operator packet data network, e.g., for provision of IMS services. This reference point corresponds to Gi for 3GPP accesses. |

<Next Generation Mobile Communication Network>

Thanks to the success of Long Term Evolution (LTE) and LTE-Advanced (LTE-A) for 4G mobile communication, interest in the next generation, namely 5G mobile communication increases and thus study on the 5G mobile communication is progressing.

The 5th generation mobile telecommunications defined by the International Telecommunication Union (ITU) refers to communication providing a data transmission rate of up to 20 Gbps and an actual minimum transmission rate of at least 100 Mbps in any location. The official name of the 5th generation mobile telecommunications is 'IMT-2020' and ITU's goal is to commercialize the 'IMT-2020' worldwide by 2020.

The ITU proposes three usage scenarios, for example, enhanced Mobile Broadband (eMBB), massive Machine Type Communication (mMTC) and Ultra Reliable and Low Latency Communications (URLLC).

First, the URLLC relates to a usage scenario requiring high reliability and low latency. For example, services such as automatic driving, factory automation, augmented reality require high reliability and low latency (e.g., a delay time of less than 1 ms). The delay time of current 4G (LTE) is statistically 21 to 43 ms (best 10%) and 33 to 75 ms (median). This is insufficient to support a service requiring a delay time of 1 ms or less.

Next, the eMBB usage scenario relates to a usage scenario requiring mobile ultra-wideband.

It seems difficult for this ultra-wideband high-speed service to be accommodated by the core network designed for legacy LTE/LTE-A.

Therefore, in the so-called fifth generation mobile communication, a redesign of the core network is urgently required.

FIG. 2 is an exemplary diagram illustrating a predicted structure of a next generation mobile communication in terms of a node.

Referring to FIG. 2, the UE is connected to a data network (DN) through a next generation RAN (Radio Access Network).

The Control Plane Function (CPF) node shown in FIG. 2 may perform all or part of the Mobility Management Entity (MME) function of the fourth generation mobile communication, and all or a part of the control plane function of the Serving Gateway (S-GW) and the PDN-gateway (P-GW) of the fourth generation mobile communication. The CPF node includes an Access and Mobility Management Function (AMF) node and a Session Management Function (SMF) node.

The user plane function (UPF) node shown in the drawing is a type of a gateway over which user data is transmitted and received. The UPF node may perform all or part of the user plane functions of the S-GW and the P-GW of the fourth generation mobile communication.

The Policy Control Function (PCF) node shown in FIG. 2 is configured to control a policy of the service provider.

The illustrated Application Function (AF) node refers to a server for providing various services to the UE.

The Unified Data Management (UDM) node as shown refers to a type of a server that manages subscriber information, such as a Home Subscriber Server (HSS) of 4th generation mobile communication. The UDM node stores and manages the subscriber information in the Unified Data Repository (UDR).

The Authentication Server Function (AUSF) node as shown authenticates and manages the UE.

The Network Slice Selection Function (NSSF) node as shown refers to a node for performing network slicing as described below.

In a 3GPP system, a conceptual link that connects NFs within a 5G system is defined as a reference point. Listed below are exemplary reference points being included in a 5G system architecture, as shown in FIG. 2.

N1: Reference point between UE and AMF
N2: Reference point between (R)AN and AMF
N3: Reference point between (R)AN and UPF
N4: Reference point between SMF and UPF
N5: Reference point between PCF and AF
N6: Reference point between UPF and Data Network (DN)
N7: Reference point between SMF and PCF
N24: Reference point between PCF within a visited network and PCF within a home network
N8: Reference point between UDM and AMF
N9: Reference point between 2 core UPFs
N10: Reference point between UDM and SMF
N11: Reference point between AMF and SMF
N12: Reference point between AMF and AUSF
N13: Reference point between UDM and Authentication Server function (AUSF)
N14: Reference point between 2 AMFs
N15: In case of a non-roaming scenario, reference point between PCF and AMF, and, in case of a roaming scenario, reference point between PCF and AMF within a visited network
N16: Reference point between 2 SMFs (In case of a roaming scenario, reference point between SMF within a visited network and SMF within a home network)
N17: Reference point between AMF and EIR
N18: Reference point between any NF and UDSF
N19: Reference point between NEF and SDSF FIG. 3 is an exemplary diagram illustrating an architecture for supporting a concurrent access through two data networks.

FIG. 3 illustrates an architecture that allows the UE to simultaneously access two data networks using one PDU session.

<Network Slice>

The following describes the slicing of the network to be introduced in the next generation mobile communication.

Next-generation mobile communication introduces the concept of network slicing in order to provide various services through a single network. In this connection, slicing a network refers to a combination of network nodes with the functions needed to provide a specific service. The network node that constitutes the slice instance may be a hardware independent node, or it may be a logically independent node.

Each slice instance may consist of a combination of all the nodes needed to construct the entire network. In this case, one slice instance alone may provide service to the UE.

Alternatively, the slice instance may consist of a combination of some of the nodes that make up the network. In this case, the slice instance may provide service to the UE in relation with other existing network nodes without the slice instance alone providing the service to the UE. In addition, a plurality of slice instances may cooperate with each other to provide the service to the UE.

The slice instance may differ from a dedicated core network in that all network nodes, including the core network (CN) node and the RAN may be separated from each other. Further, the slice instance differs from the dedicated core network in that the network nodes may be logically separated.

<Roaming in Next Generation Mobile Communication Network>

Meanwhile, there are two schemes of processing a signaling request from the UE in a situation in which the UE roams to a visited network, e.g., a Visited Public Land Mobile Network (VPLMN). In a local break out (LBO) scheme which is a first scheme, the signaling request from the UE is processed in the visited network. According to a home routing (HR) scheme which is a second scheme, the visited network delivers the signaling request from the UE to a home network.

FIG. 4a is an exemplary diagram illustrating an architecture to which a local breakout (LBO) scheme is applied during roaming, and FIG. 4b is an exemplary diagram illustrating an architecture to which a home routed (HR) scheme is applied during roaming.

As illustrated in FIG. 4a, in an architecture to which the LBO scheme is applied, data of a user is delivered to a data network in the VPLMN. To this end, the PCF in the VPLMN performs an interaction with the AF in order to generate a PCC rule for a service in the VPLMN. A CPF node in the VPLMN generates the PCC rule based on a policy set internally according to a roaming agreement with a Home Public Land Mobile Network (HPLMN) operator.

As illustrated in FIG. 4b, in an architecture to which the HR scheme is applied, data of the UE is delivered to the data network in the HPLMN.

<Data Detouring to Non-3GPP Network>

In the next generation mobile communication, the data of the UE may be detoured to a non-3GPP network, e.g., a Wireless Local Area Network (WLAN) or WiFi.

FIGS. 5a to 5f illustrate architectures for detouring data to a non-3GPP network.

The Wireless Local Area Network (WLAN) or Wi-Fi is considered as an untrusted non-GPP network. In order to connect the non-3GPP network to a core network, Non-3GPP InterWorking Function (N3IWF) may be added.

Meanwhile, a LADN area for the UE may be changed due to subscriber information or a policy of a network system. In case a UE, which is not aware of the change in the LADN area, transmits a PDU session establishment/modification request for the existing (or old) LADN area to the network system, the network system rejects the PDU session establishment/modification request of the UE.

At this point, in case the UE re-transmits the PDU session establishment/modification request for the existing (or old) LADN area, the network system re-rejects the request made by the UE. And, this may lead to a problem of having unnecessary signaling occurring between the UE and the network system.

SUMMARY OF THE DISCLOSURE

Technical Objects

Accordingly, disclosures of this specification are to solve the problems.

Technical Solutions

In order to achieve the above-described object, a disclosure of this specification provides a method for performing, by a user equipment (UE), a PDU session establishment request, in case information on a Local Area Data Network (LADN) area is changed. The method may include the steps of performing a first PDU session establishment request for a first LADN area, in case the first PDU session establishment request is transmitted from outside of the first LADN area, receiving a Reject message rejecting the first PDU session establishment request from a network system, in case the Reject message is received, transmitting a registration update request for updating a LADN area to the network system, receiving information on an updated second LADN area as a response to the registration update request, and performing a second PDU session establishment request for the second LADN area.

In case the Reject message is received, the UE may stop/abort the first PDU session establishment request for the first LADN area.

The information on the second LADN area may be included in a registration update accept message.

In case the Reject message is received, the UE may delete the information on the first LADN area. Additionally, the UE may add or update (or renew) the information on the second LADN area.

The method may further include a step of receiving a Configuration Update Command message from an Access and Mobility Management Function (AMF) node of the network system, wherein the Configuration Update Command may be triggered by a request made by a Session Management Function (SMF) node of the network system, and wherein the information on the second LADN area may be included in the Configuration Update Command.

In order to achieve the above-described object, another disclosure of this specification provides a user equipment (UE) performing a PDU session establishment request. The user equipment (UE) may include a transceiver transmitting and/or receiving signals, and a processor controlling the transceiver.

Herein, the processor may be configured to perform a first PDU session establishment request for a first LADN area, in case the first PDU session establishment request is transmitted from outside of the first LADN area, to receive a Reject message rejecting the first PDU session establishment request from a network system, in case the Reject message is received, to transmit a registration update request for updating a LADN area to the network system, to receive information on an updated second LADN area as a response to the registration update request, and to perform a second PDU session establishment request for the second LADN area.

Effects of the Disclosure

According to a disclosure of this specification, in case the UE performs a PDU session establishment/modification request for a wrong LADN area, unnecessary signaling between a UE and a network system may be prevented from occurring.

DESCRIPTION OF EXEMPLARY EMBODIMENTS

Figure 1:
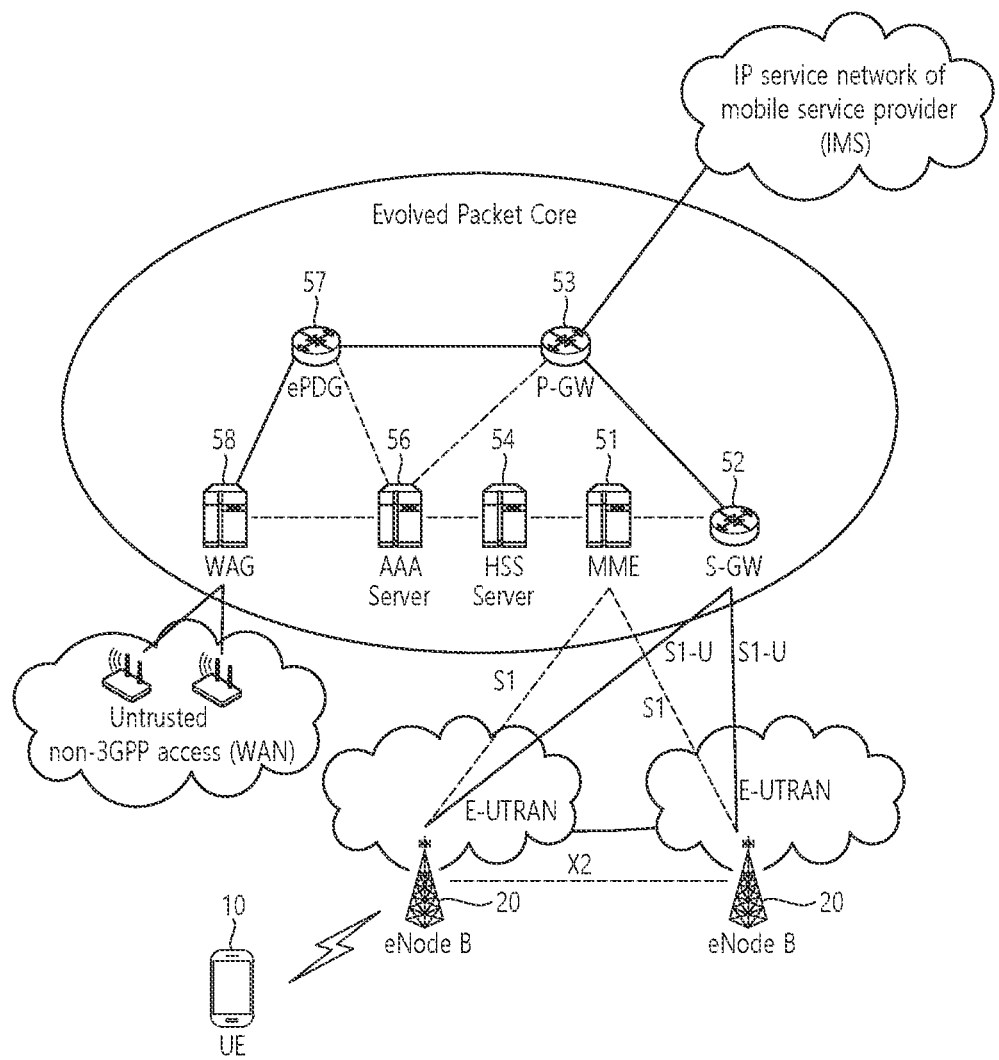
FIG. 1 shows an exemplary architecture of an evolved mobile communication network.
Figure 2:
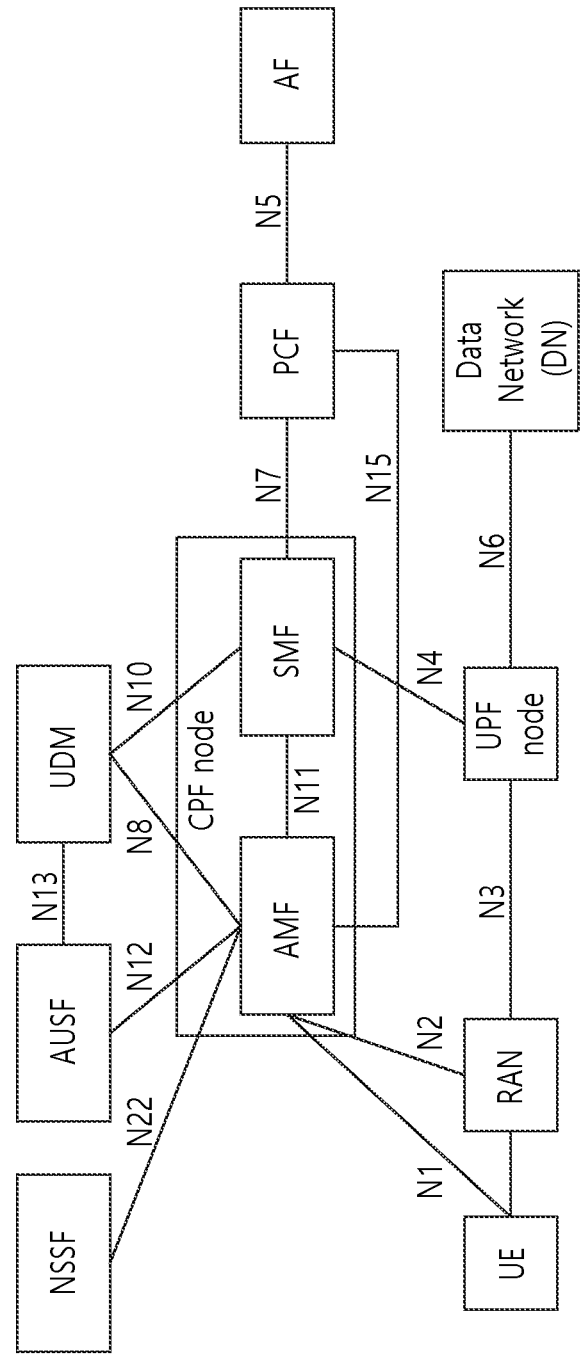
FIG. 2 is an exemplary diagram illustrating a predicted structure of a next generation mobile communication in terms of a node.
Figure 3:
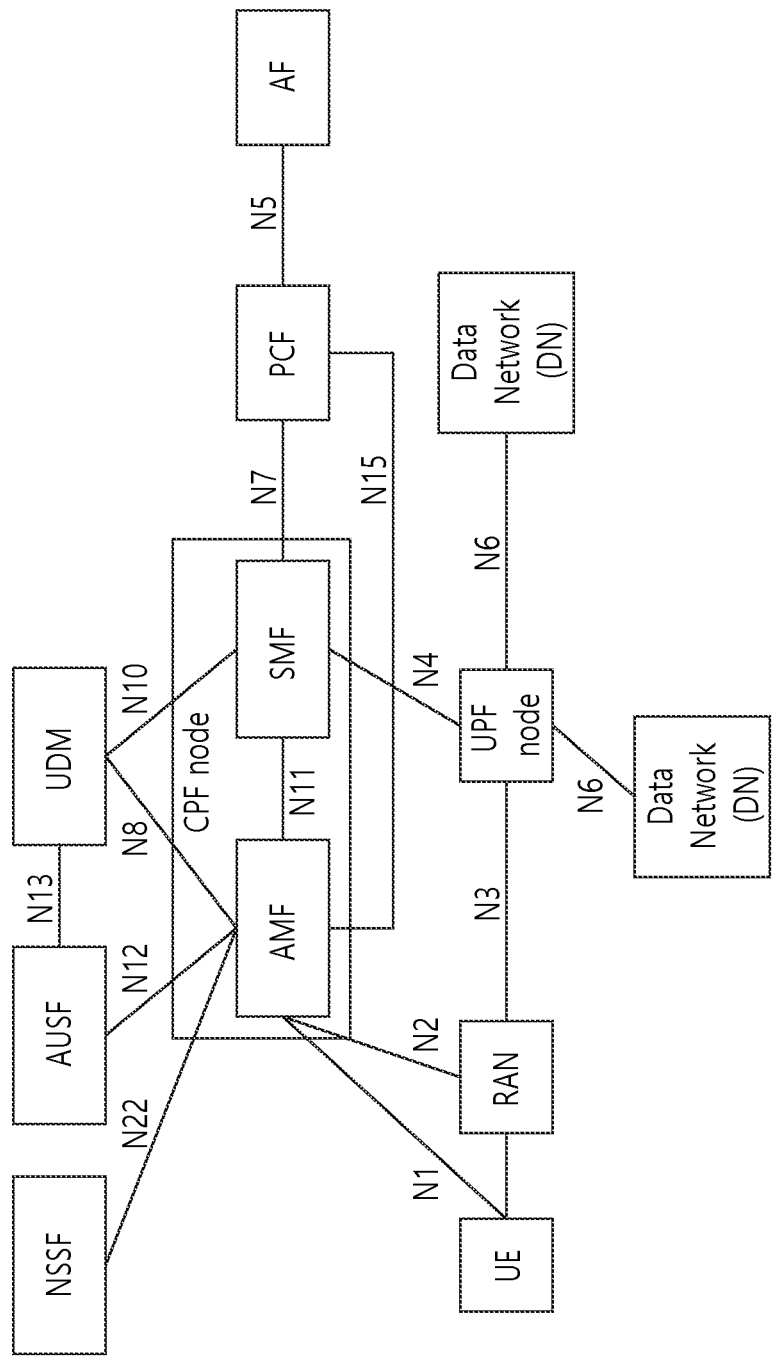
FIG. 3 is an exemplary diagram illustrating an architecture for supporting a concurrent access through two data networks.
Figure 4A:
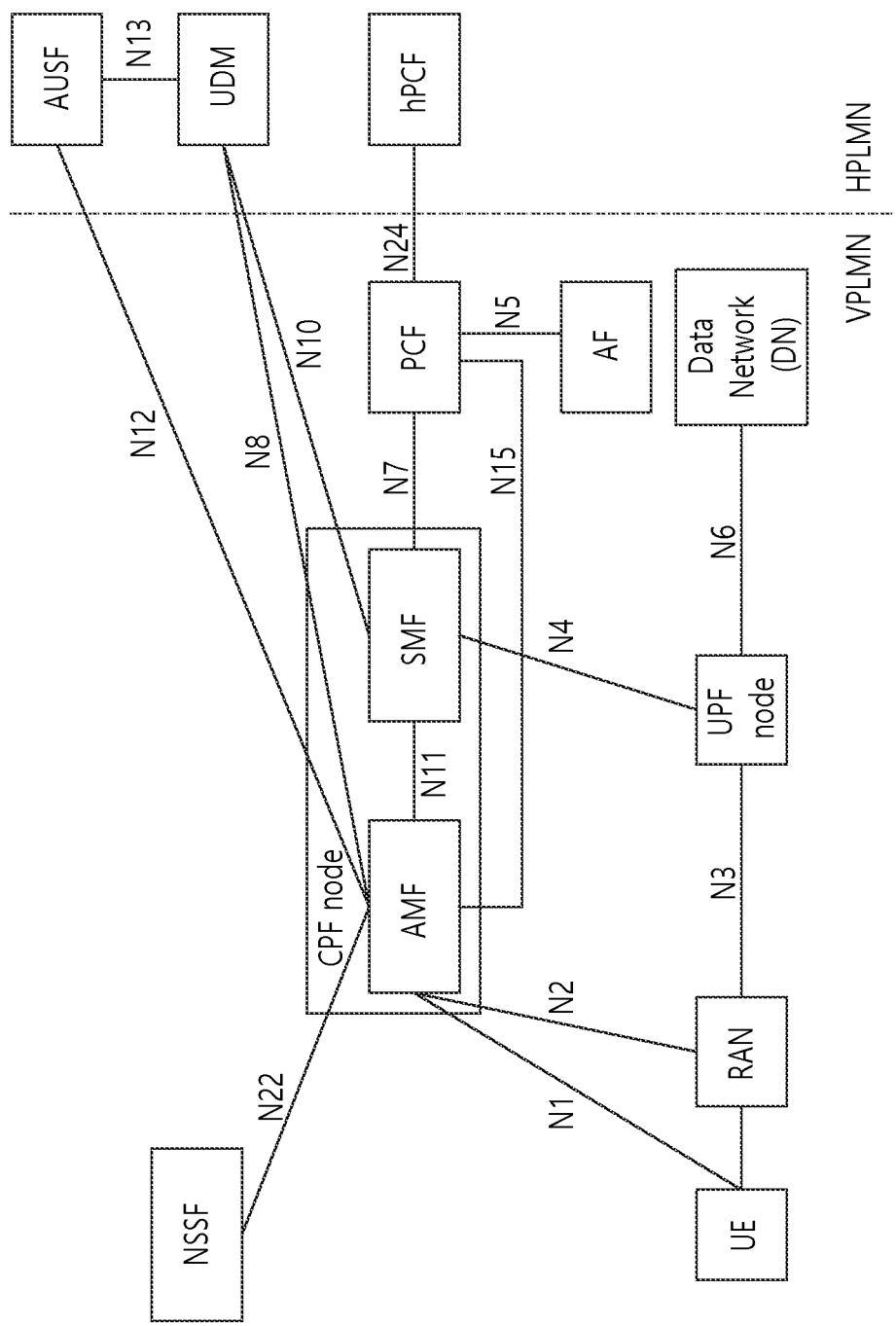
FIG. 4a is an exemplary diagram illustrating an architecture to which a local breakout (LBO) scheme is applied during roaming.
Figure 4B:
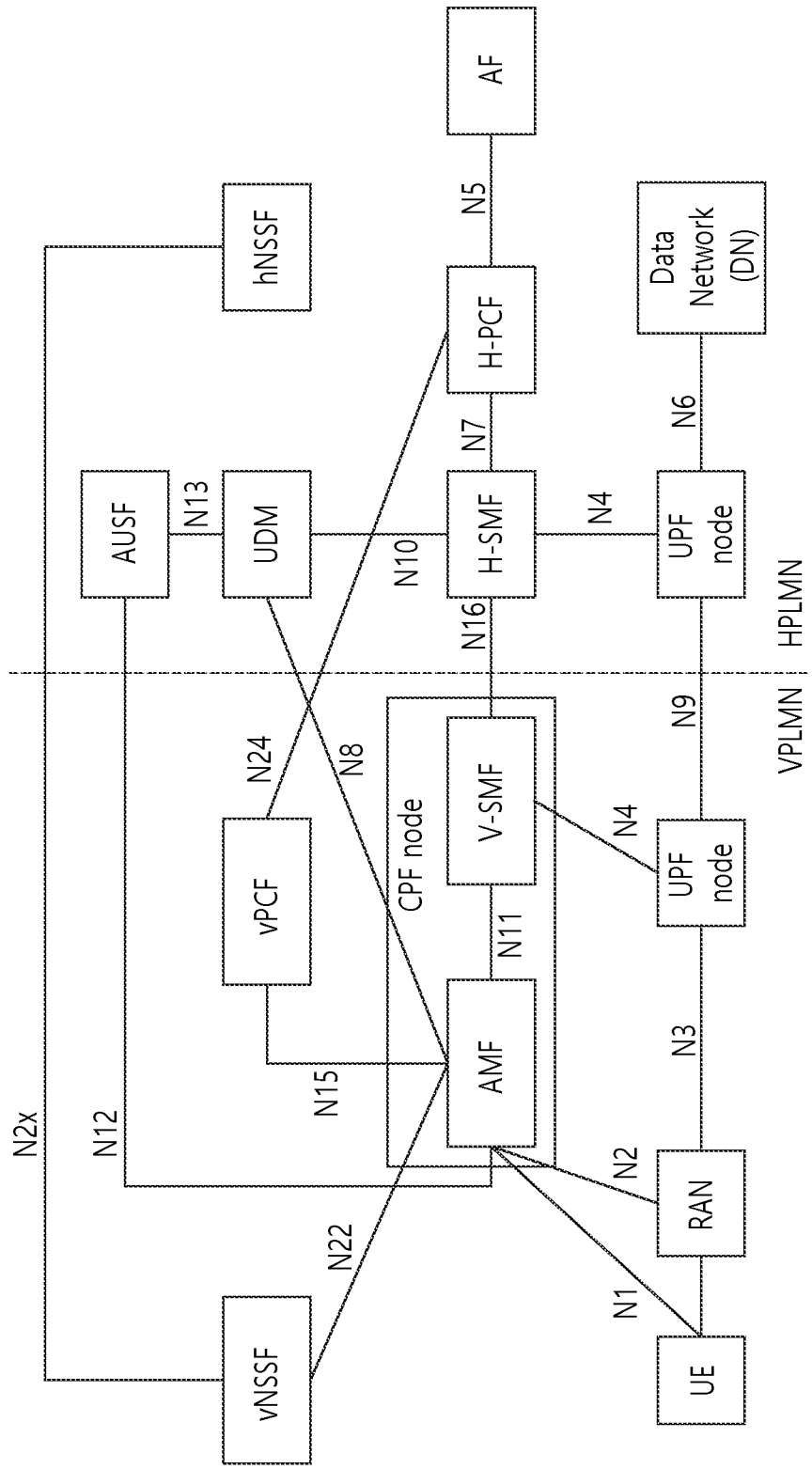
FIG. 4b is an exemplary diagram illustrating an architecture to which a home routed (HR) scheme is applied during roaming.
Figure 5A:
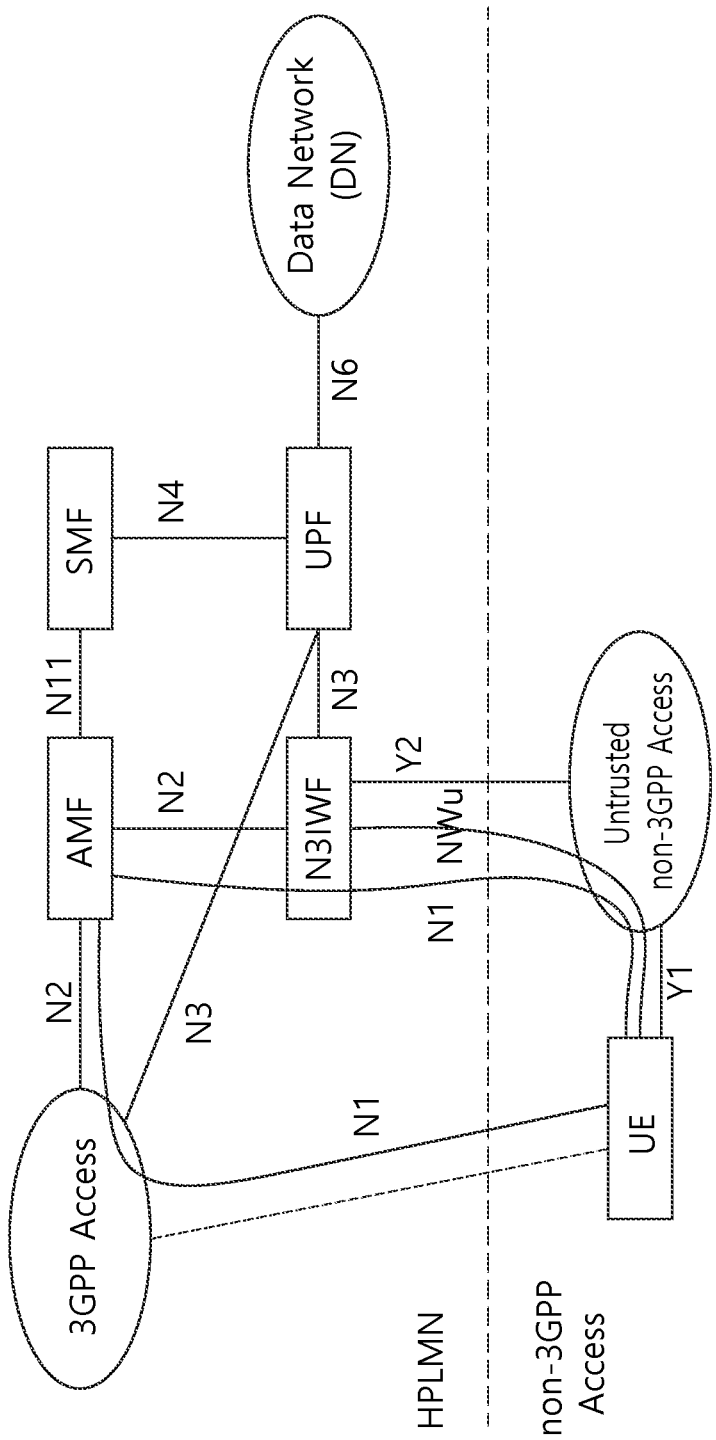
FIGS. 5a to 5f illustrate architectures for detouring data to a non-3GPP network.
Figure 5B:
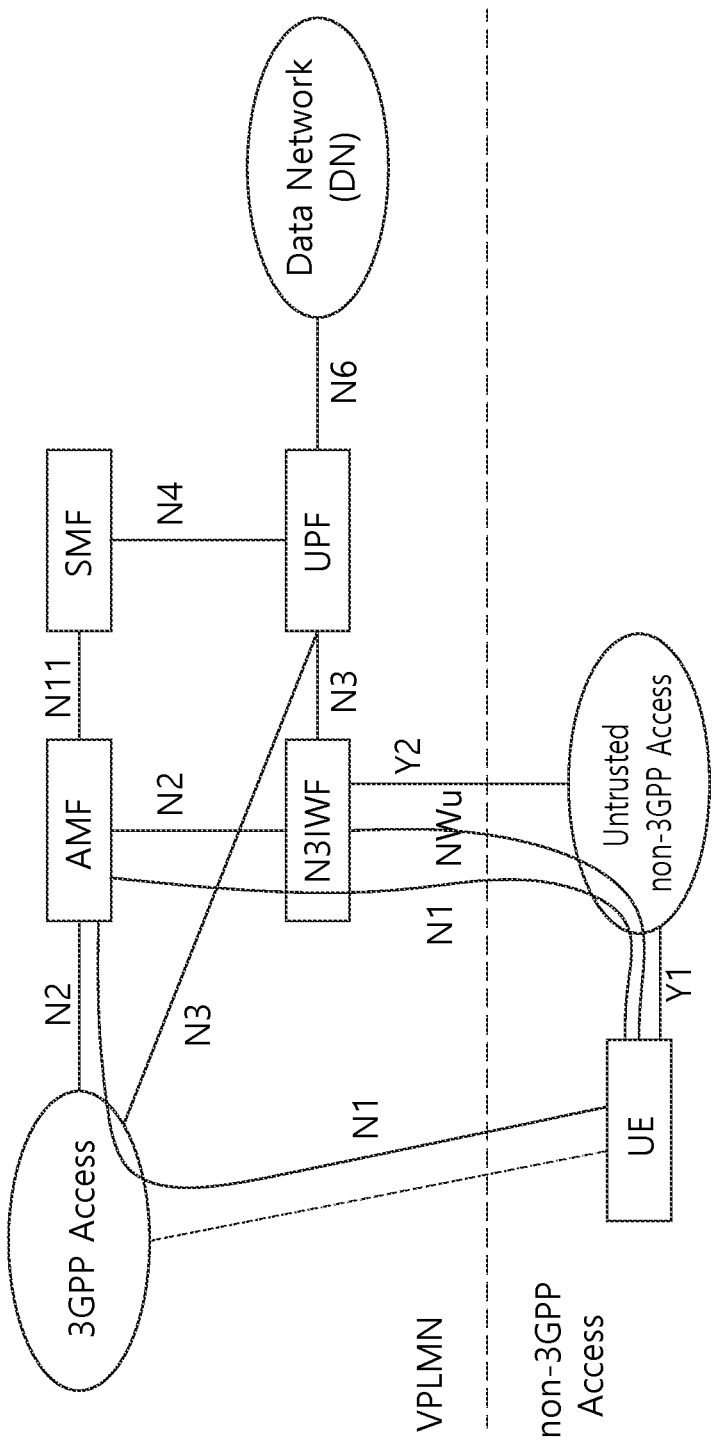
Figure 5C:
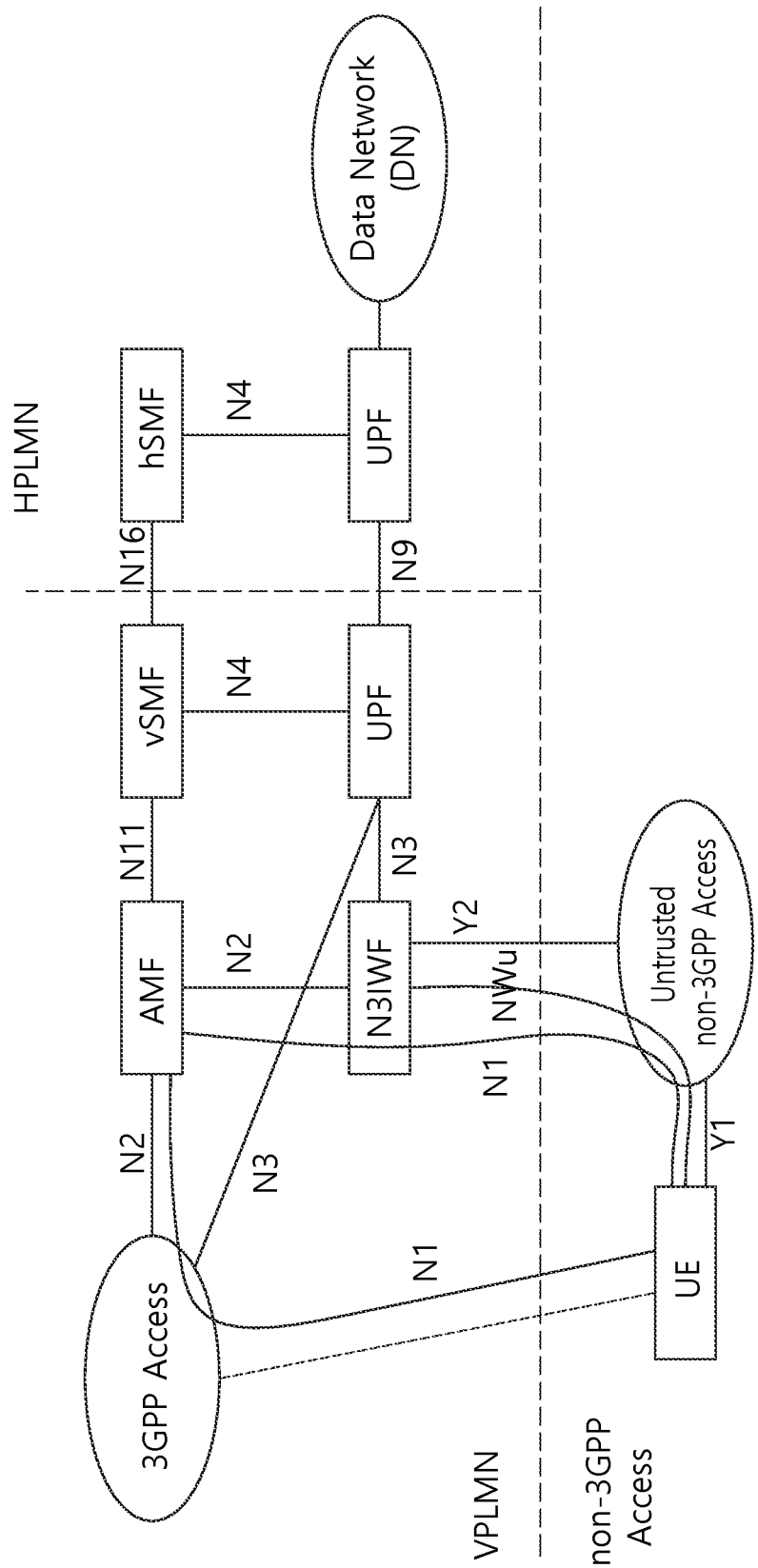
Figure 5D:
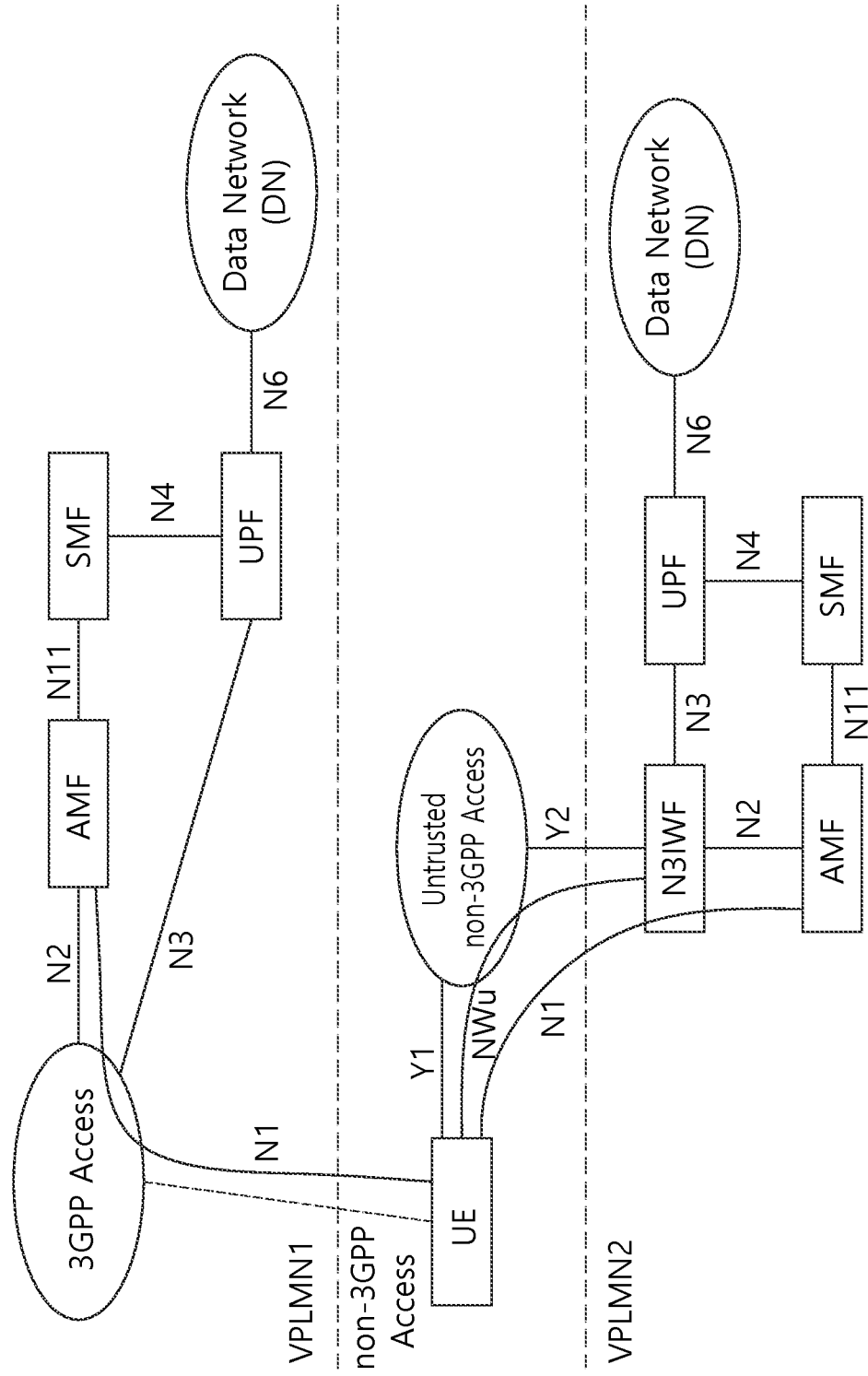
Figure 5E:
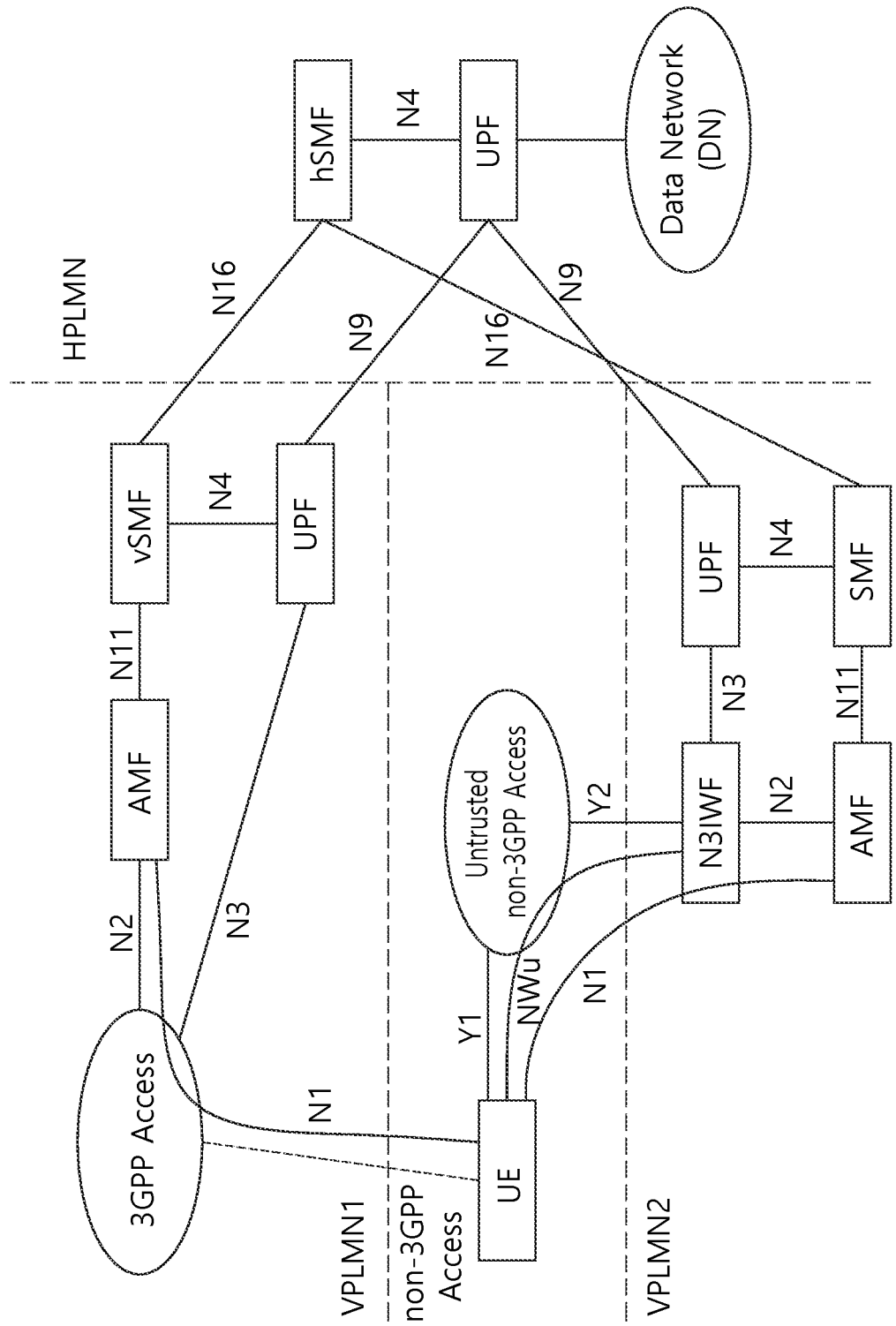
Figure 5F:
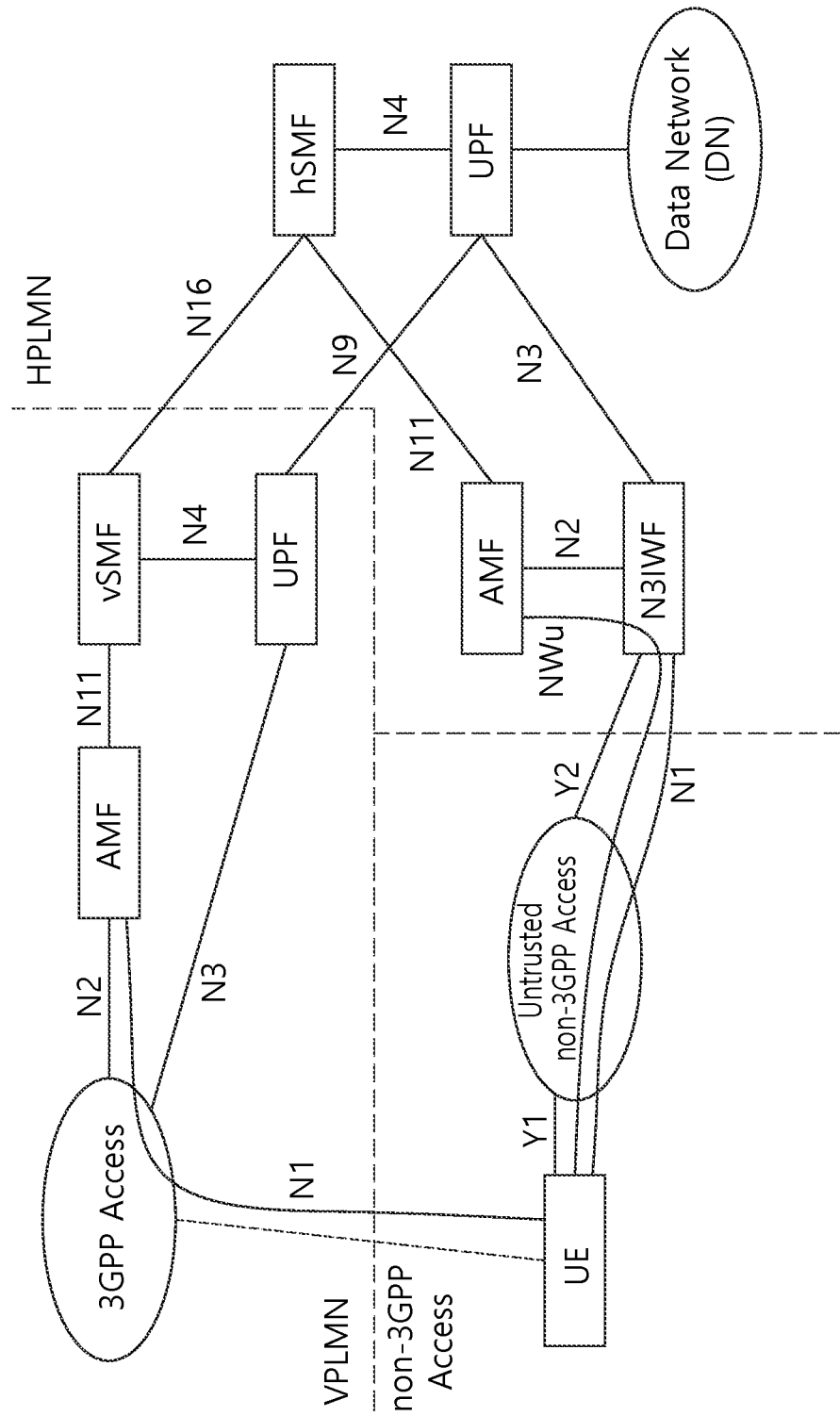

The technical terms used herein are used to merely describe specific embodiments and should not be construed as limiting the present disclosure. Further, the technical terms used herein should be, unless defined otherwise, interpreted as having meanings generally understood by those skilled in the art but not too broadly or too narrowly. Further, the technical terms used herein, which are determined not to exactly represent the spirit of the disclosure, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present disclosure includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present disclosure, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present disclosure.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present disclosure will be described in greater detail with reference to the accompanying drawings. In describing the present disclosure, for ease of understanding, the same reference numerals are used to denote the same components throughout the drawings, and repetitive description on the same components will be omitted. Detailed description on well-known arts which are determined to make the gist of the disclosure unclear will be omitted. The accompanying drawings are provided to merely make the spirit of the disclosure readily understood, but not should be intended to be limiting of the disclosure. It should be understood that the spirit of the disclosure may be expanded to its modifications, replacements or equivalents in addition to what is shown in the drawings.

In the appended drawings, although a User Equipment (UE) is illustrated as an example, the UE shown in the drawings may be referred to as other terms, such as a UE (100) (terminal), a mobile equipment (ME), and so on. Additionally, the UE may be a portable device, such as a laptop computer, a mobile phone, a PDA, a smart phone, a multimedia device, and so on, or the UE may be a non-portable device, such as a personal computer (PC) or a vehicle mounted device.

Figure 6:
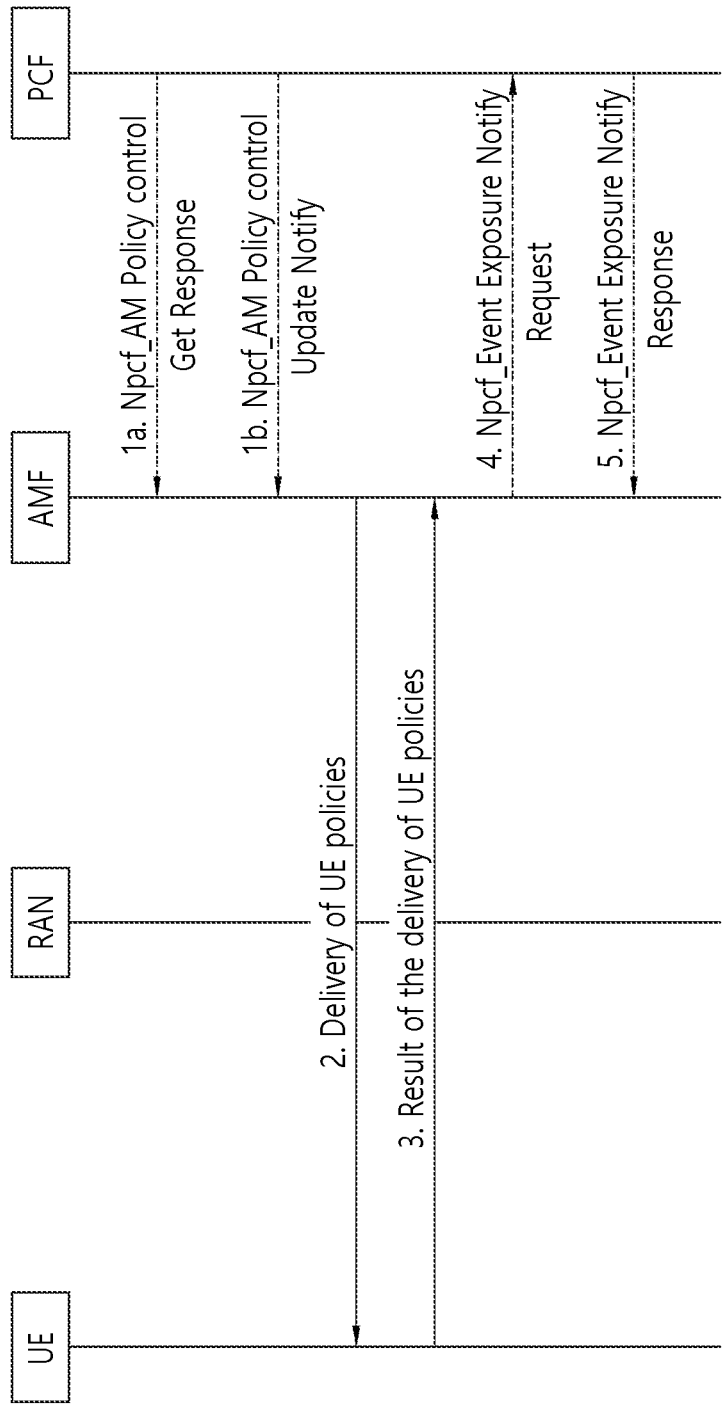
FIG. 6 is a signal flow chart showing a UE configuration update procedure.

FIG. 6 is a signal flow chart showing a UE configuration update procedure.

The UE configuration update procedure shown in FIG. 6 may be initiated when a PCF intends to update UE access and PDU Session selection information (i.e., UE policy) within the UE configuration.

1a. An AMF receives an Npcf_AMPolicyControlGet response from a PCF. The Npcf_AMPolicyControlGet response may be Access and mobility related information or a UE Policy container (UE access and PDU session selection related information) or may include both.

1b. Instead of Step 1a, an AMF receives an Npcf_AM-PolicyControl UpdateNotify from a PCF. The Npcf_AM- PolicyControl UpdateNotify may be Access and mobility related information or a UE Policy container (UE access and PDU session selection related information) or may include both.

2. In case the UE is in a CM-IDLE mode, the AMF triggers a Network-Triggered Service Request. In case the UE is not reachable, the AMF reports to the PCF that the UE policy container cannot be transported (or delivered) to the UE. In case the UE is in a CM-CONNECTED mode, the AMF transmits the UE Policy container, which is received from the PCF, to the UE. The UE Policy container includes a PSI list, which notifies to the UE that one or more PSIs are added, removed, or modified.

3. The UE performs PSI operations and transmits the results to the AMF. The AMF then delivers the results to the PCF. If one PSI operation fails, or if two or more PSI operations fail, the UE includes a UE policy container (stored PSI list).

4. If the AMF receives the UE policy container, and if the PCF subscribes in order to receive notification of the UE Policy container, the AMF delivers a response of the UE to the PCF by using Namf_EventExposure, which includes an EventID indicating the reception of the UE policy container by the PCF, and EventInformation, which includes the UE policy container.

5. The PCF transmits its verification (or acknowledgement) of the reception of the Namf_EventExposure to the AMF.

<Registration Procedure>

In order to allow mobility tracking and data reception to be performed, and in order to receive a service, the UE needs to gain authorization. For this, the UE shall register to a network. The registration procedure is performed when the UE needs to perform initial registration to a 5G system. Additionally, the Registration Procedure is performed when the UE performs periodic registration update, when the UE relocates to a new tracking area (TA) in an Idle state, and when the UE needs to perform periodic registration renewal.

During the initial registration procedure, an ID of the UE may be obtained from the UE. The AMF may forward (or transfer) a PEI (IMEISV) to a UDM, SMF, and PCF.

Figure 7A:
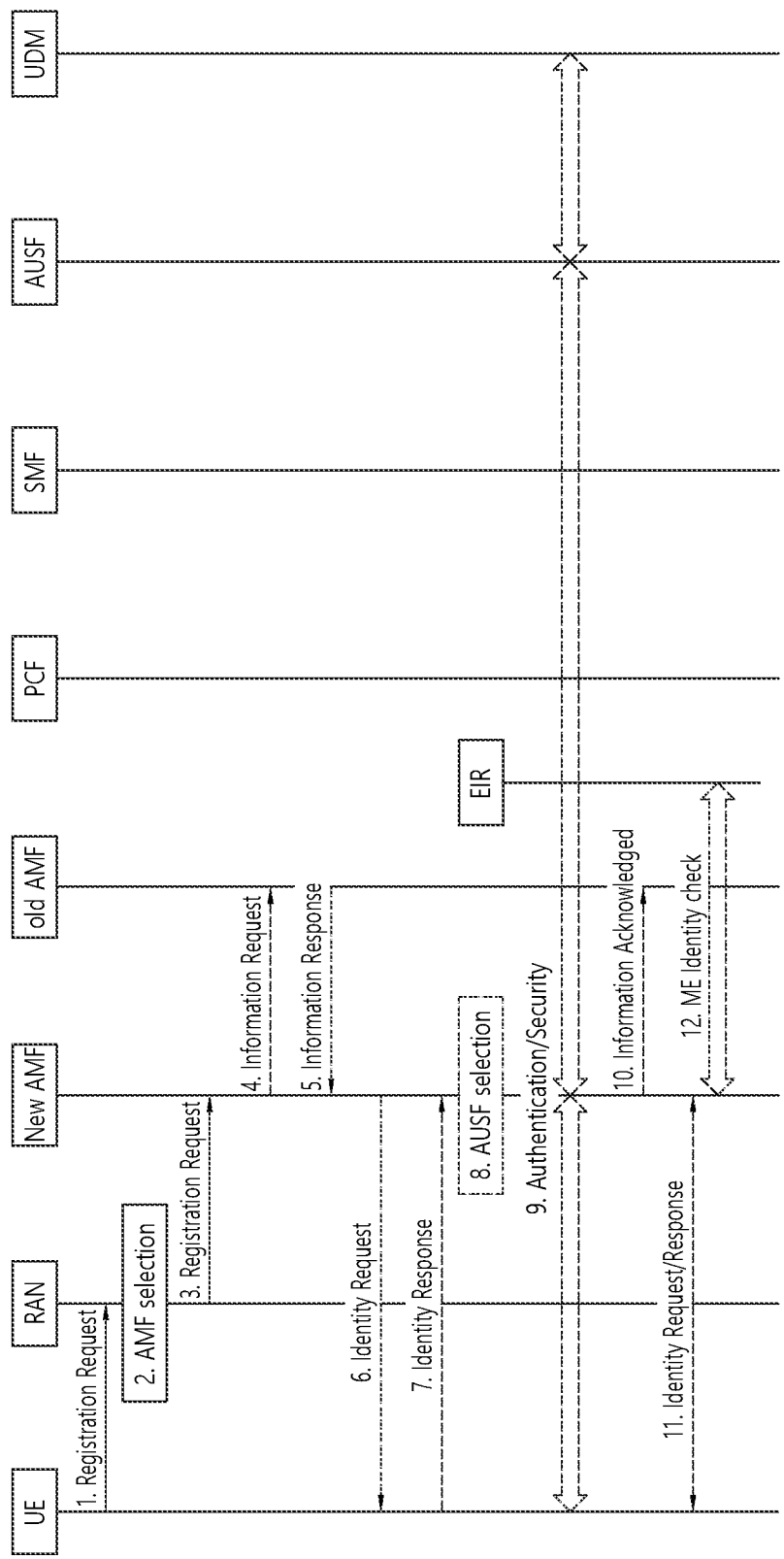
FIGS. 7a and 7b are signal flow charts showing an exemplary registration procedure.
Figure 7B:
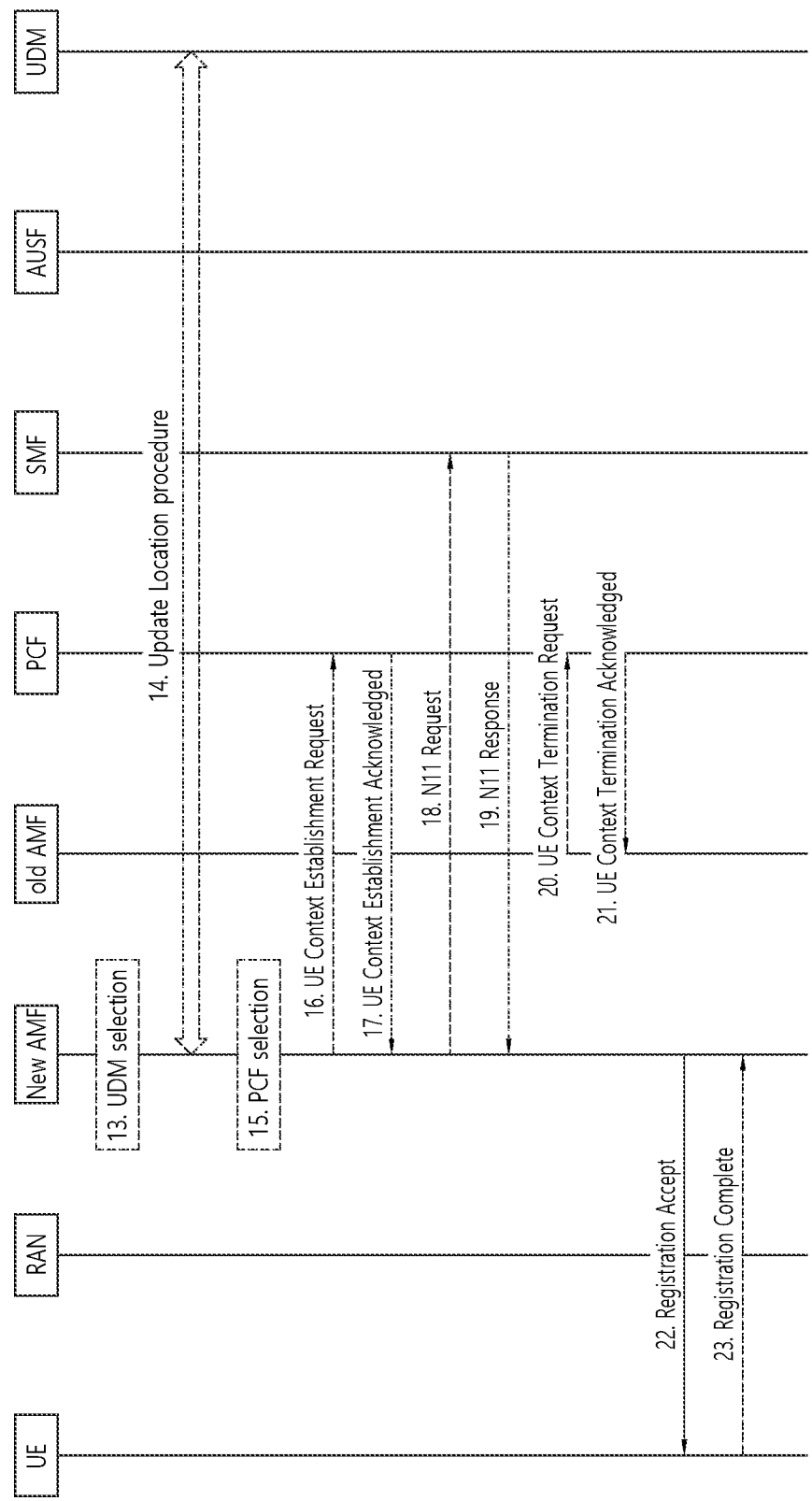

FIGS. 7a and 7b are signal flow charts showing an exemplary registration procedure.

1) The UE may transmit an AN message to the RAN. The AN message may include an AN parameter and a registration request message. The registration request message may include information, such as a register type, a subscriber permanent ID or temporary user ID, a security parameter, NASSAI, 5G capability of the UE, a PDU session status, and so on.

In case of a 5G RAN, the AN parameter may include a SUPI or a temporary user ID, a selected network, and NASSAI.

The registration type may indicate whether the registration is an "initial registration" (i.e., the UE is in a non-registered state), "mobility registration update" (i.e., the UE is in a registered state, and the registration procedure is initiated by mobility), or "periodic registration update" (i.e., the UE is in a registered state, and the registration procedure is initiated due to the expiration of a periodic update timer). In case a temporary user ID is included, the temporary user ID indicates a last serving AMF. In case the UE has already been registered in a PLMN other than the PLMN of a 3GPP access through a non-3GPP access, the UE may not provide a UE temporary ID, which is allocated by the AMF during a registration procedure through the non-3GPP access.

The security parameter may be used for authentication and integrity protection.

The PDU session status indicates a PDU session that is available (and previously configured) in the UE.

2) In case the SUPI is included, or in case the temporary user ID does not indicate a valid AMF, the RAN may select an AMF based on a (R)AT and NSSAI.

In case the (R)AN cannot select an appropriate AMF, any AMF is selected according to a local policy, and the registration request is forwarded (or transferred) by using the selected AMF. If the selected AMF cannot provide service to the UE, the selected AMF may select another AMF that is more appropriate for the UE.

3) The RAN transmits an N2 message to a new AMF. The N2 message includes an N2 parameter and a registration request. The registration request may include a registration type, a subscriber permanent identifier or temporary user ID, a security parameter, NSSAI, MICO mode default settings (or configuration), and so on.

When a 5G-RAN is used, the N2 parameter includes location information related to a cell in which the UE is camping, a cell identifier, and a RAT type.

If the registration type indicated by the UE is a periodic registration update, Process 4 to Process 17, which will be described in detail later on, may not be performed.

4) The newly selected AMF may transmit an information request message to the previous AMF.

In case the temporary user ID of the UE is included in a registration request message, and in case the serving AMF is changed after the last registration, a new AMF may include an information request message, which includes complete registration request information for requesting SUPI and MM context of the UE, to the previous (or old) AMF.

5) The previous (or old) AMF transmits an information response message to the newly selected AMF. The information response message may include SUPI, MM context, and SMF information.

More specifically, the previous (or old) AMF transmits an information response message including SUPI and MM context of the UE.

In case information on an active PDU session is included in the previous (or old) AMF, SMF information including SMF ID and PDU session ID may be included in the information response message of the previous (or old) AMF.

6) In case the SUPI is not provided by the UE, or in case the SUPI is not searched from the previous (or old) AMF, the new AMF transmits an Identity Request message to the UE.

7) The UE transmits an Identity Response message including the SUPI to the new AMF.

8) The AMF may determine to perform triggering of an AUSF. In this case, the AMF may select an AUSF based on the SUPI.

9) The AUSF may initiate authentication of the UE and the NAS security function.

10) The new AMF may transmit an information response message to the previous (or old) AMF.

If the AMF is changed the new AMF may transmit the information response message in order to verify the forwarding of UE MM context.

If the authentication/security procedure is failed, the registration is rejected, and the new AMF may transmit a rejection message to the previous (or old) AMF.

11) The new AMF may transmit an Identity Request message to the UE.

In case a PEI is not provided by the UE, or in case a PEI is not searched from the previous (or old) AMF, an Identity Request message may be transmitted in order to allow the AMF to search the PEI.

12) The new AMF checks an ME identifier.

13) If Process 14, which will be described later on, is performed, the new AMF selects a UDM based on the SUPI.

14) If the AMF is modified after the final registration, if valid subscription context of the UE does not exist in the AMF, or if the UE provides a SUPI, wherein the AMF does not refer to a valid context, the new AMF initiates an Update Location procedure. Alternatively, even in a case where a UDM initiates Cancel Location for the previous AMF, the Update Location procedure may be initiated. The previous (or old) AMF discards the MM context and notifies all possible SMF(s), and, after obtaining AMF-related subscription data from the UDM, the new AMF generates MM context of the UE.

In case network slicing is used, the AMF obtains allowed NSSAI based on the requested NSSAI and UE subscription and local policy. In case the AMF is not appropriate for supporting the allowed NSSAI, the registration request is re-routed.

15) The new AMF may select a PCF based on the SUPI.

16) The new AMF transmits a UE Context Establishment Request message to the PCF. The AMF may request an operator policy for the UE to the PCF.

17) The PCF transmits a UE Context Establishment Acknowledged message to the new AMF.

18) The new AMF transmits an N11 request message to the SMF.

More specifically, when the AMF is changed, the new AMF notifies the new AMF that provides services to the UE to each SMF. The AMF authenticates the PDU session status from the UE by using available SMF information. In case the AMF is changed, the available SMF information may be received from the previous (or old) AMF. The new AMF may send a request to the SMF to release (or cancel) network resources related to a PDU session that is not activated in the UE.

19) The new AMF transmits an N11 response message to the SMF.

20) The previous (or old) AMF transmits a UE Context Termination Request message to the PCF.

In case the previous (or old) AMF has previously requested UE context to be configured in the PCF, the previous (or old) AMF may delete the UE context from the PCF.

21) The PCF may transmit a UE Context Termination Request message to the previous (or old) AMF.

22) The new AMF transmits a Registration Accept message to the UE. The Registration Accept message may include a temporary user ID, registration area, mobility restriction, PDU session status, NSSAI, periodic registration update timer, and allowed MICO mode.

In case the AMF allocated a new temporary user ID, the temporary user ID may be further included in the Registration Accept message. In case the mobility restriction is applied to the UE, information indicating the mobility restriction may be additionally included in the Registration Accept message. The AMF may include information indicating the PDU session status for the UE in the Registration Accept message. The UE may remove any internal resource being related to a PDU session that is not marked as being active from the received PDU session status. If the PDU session status information is included in the Registration Request, the AMF may include the information indicating the PDU session status to the UE in the Registration Accept message.

23) The UE transmits a Registration Complete message to the new AMF.

<PDU Session Establishment Procedure>

For the PDU Session Establishment procedure, two different types of PDU Session Establishment procedures may exist as described below.

A PDU Session Establishment procedure initiated by the UE.

A PDU Session Establishment procedure initiated by the network. For this, the network may transmit a Device Trigger message to an application (or applications) of the UE.

Figure 8A:
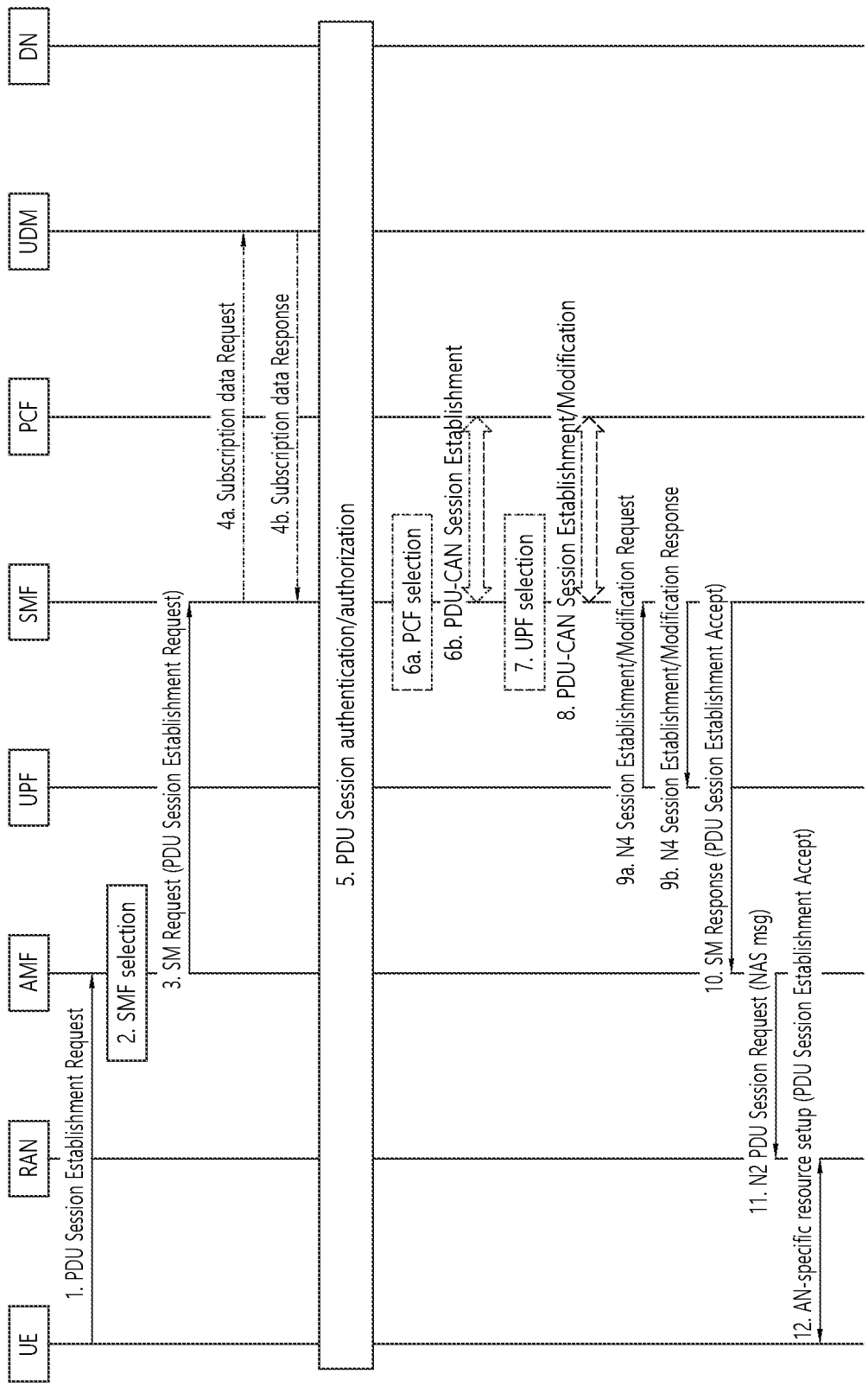
FIGS. 8a and 8b are signal flow charts showing an exemplary PDU Session Establishment procedure.
Figure 8B:
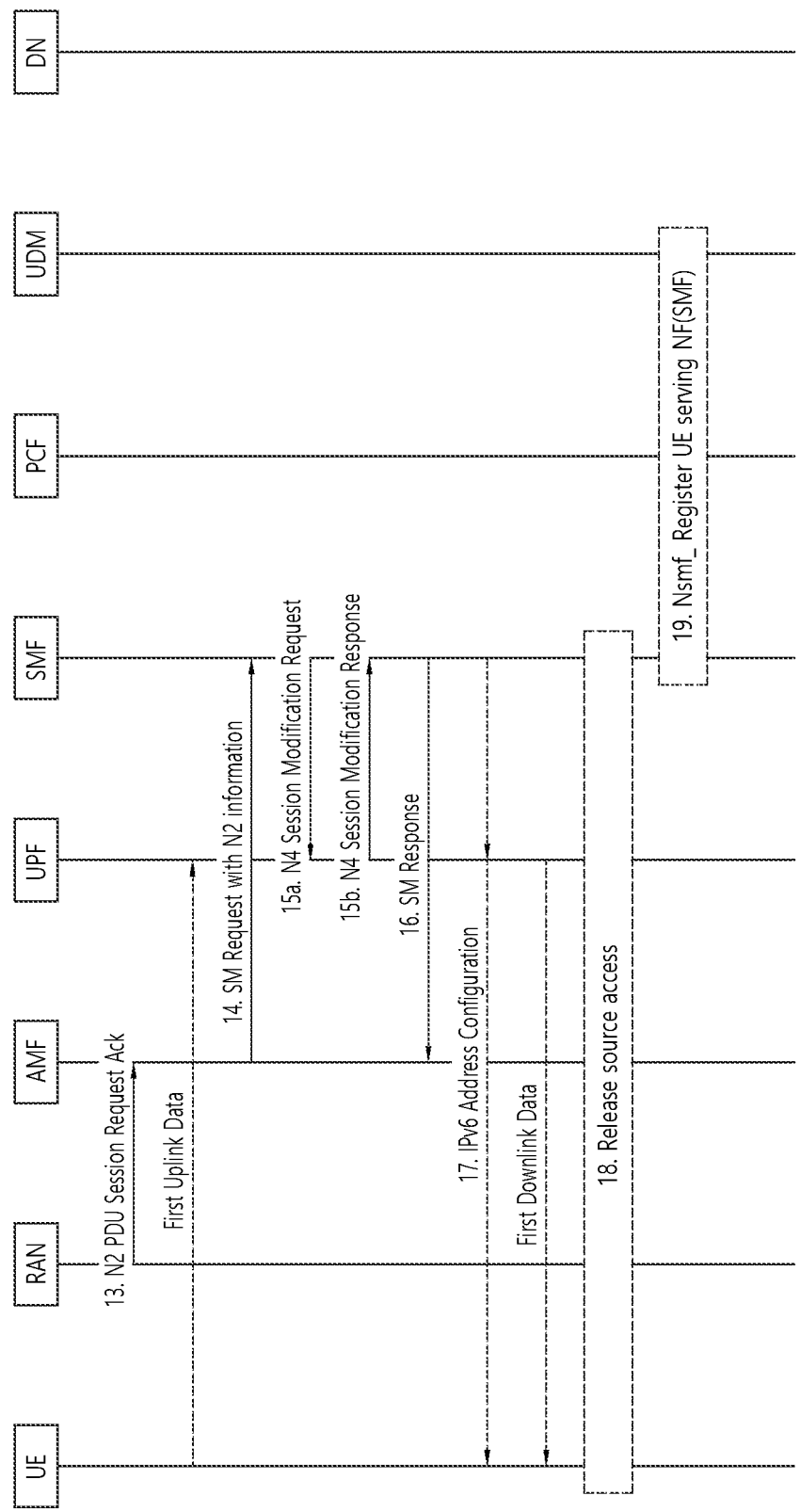

FIGS. 8a and 8b are signal flow charts showing an exemplary PDU Session Establishment procedure.

In the procedure shown in FIGS. 8a and 8b, it will be assumed that, according to the Registration procedure shown in FIGS. 7a and 7b, the UE has already been registered in the AMF. Therefore, it will be assumed that the AMF has already obtained the user subscriber data from the UDM.

1) The UE transmits a NAS message to the AMF. The message may include Single-Network Slice Selection Assistance Information (S-NSSAI), DNN, PDU session ID, a Request type, N1 SM information (including PDU Session Request), and so on.

In order to establish a new PDU session, the UE may generate a new PDU session ID.

By transmitting a NAS message having a PDU Session Establishment Request message included in N1 SM information, the PDU Session Establishment procedure that is initiated by the UE may be started. The PDU Session Establishment Request message may include a Request type, an SSC mode, and a protocol configuration option.

In case the PDU Session Establishment is for configuring a new PDU session, the Request type indicates "initial access". However, in case an existing PDU session exists between the 3GPP access and the non-3GPP access, the Request type may indicate an "existing PDU session".

The NAS message being transmitted by the UE is encapsulated within an N2 message by the AN. The N2 message is transmitted to the AMF and may include user location information and access technique type information.

The N1 SM information may include an SM PDU DN request container including information on a PDU session authentication performed by an external DN.

2) In case the request type indicates an "initial request", and in case the PDU session ID has not been used for the existing PDU session of the UE, the AMF may determine that the message corresponds to a request for a new PDU session.

If the NAS message does not include the S-NSSAI, the AMF may determine default S-NSSAI for the requested PDU session according to the UE subscription. The AMF may relate a PDU session ID with an ID of the SMF and may store the PDU session ID.

3) The AMF transmits an SM request message to the SMF. The SM request message may include a subscriber permanent ID, DNN, S-NSSAI, a PDU session ID, an AMD IF, N1 SM information, user location information, and an access technique type. The N1 SM information may include a PDU session ID and a PDU Session Establishment Request message.

The AMF ID is used for identifying an AMF providing services to the UE. The N1 SM information may include the PDU Session Establishment Request message, which is received from the UE.

4a) The SMF transmits a Subscriber Data Request message to the UDM. The Subscriber Data Request message may include a subscriber permanent ID and DNN.

In the above-described Process 3, in case the Request type indicates an "existing PDU session", the SMF determines that the corresponding request is caused by a handover between the 3GPP access and the non-3GPP access. The SMF may identify the existing PDU session based on the PDU session ID.

In case the SMF has not yet searched the SN-related subscription data for the UE that is related to the DNN, the SMF may request the subscription data.

4b) The UDM may transmit a Subscription Data Response message to the SMF.

The subscription data may include an authenticated Request type, an authenticated SSC mode, and information on a default QoS profile.

The SMF may verify whether or not the UE request follows the user subscription and local policy. Alternatively, the SMF may reject the UE request via NAS SM signaling (including the related SM rejection cause), which is forwarded (or transferred) by the AMF, and then the SMF may notify to the AMF that this shall be considered as a release of the PDU session ID.

5) The SMF transmits a message to the DN through a UPF.

More specifically, in case the SMF is required to authorize/authenticate a PDU session establishment, the SMT selects a UPF and triggers the PDU.

If the PDU Session Establishment authentication/authority assignment fails, the SMF ends the PDU Session Establishment procedure and notifies the rejection to the UE.

6a) If dynamic PCC is distributed, the SMF selects a PCF.

6b) The SMF may start a PDU-CAN session establishment towards the PCF in order to obtain a default PCC rule for the PDU session. In case the Request type indicates an "existing PDU session", the PCF may start a PDU-CAN session modification instead.

7) In case the Request type of Process 3 indicates an "initial request", the SMF selects an SSC mode for the PDU session. If Process 5 is not performed, the SMF may also select a UPF. In case of Request type IPv4 or IPv6, the SMF may allocate an IP address/prefix for the PDU session.

8) In case dynamic PCC is deployed and the PDU-CAN session establishment is not yet completed, the SMF may begin (or start) PDU-CAN Session Start.

9) In case the Request type indicates an "initial request", and in case Process 5 is not performed, the SMF may use the selected UPF and start an N4 Session Establishment procedure. And, otherwise, the SMF may use the selected and start an N4 Session Modification procedure.

9a) The SMF transmits an N4 Session Establishment/Modification request message to the UPF. And, the SMF may provide packet discovery, execution, and reporting rules of packets that are to be installed in the UPF for the PDU session. In case the SMF allocates CN tunnel information, the CN tunnel information may be provided to the UPF.

9b) By transmitting an N4 Session Establishment/Modification response message, the UPF may respond. In case the CN tunnel information is allocated by the UPF, the CN tunnel information may be provided to the SMF.

10) The SMF transmits an SM response message to the AMF. The message may include a cause, N2 SM information, and N1 SM information. The N2 SM information may include a PDU session ID, a QoS profile, and CN tunnel information. The N1 SM information PDU Session Establishment Accept message. The PDU Session Establishment Accept message may include an allowed QoS rule, an SSC mode, S-NSSAI, and allocated IPv4 address.

As information that shall be forwarded to the RAN by the AMF, the N2 SM information may include the following.

CN Tunnel information: This corresponds to a core network address of an N3 tunnel corresponding to the PDU session.

QoS Profile: This is used for providing mapping between a QoS parameter and a QoS flow identifier (QFI) to the RAN.

PDU Session ID: This may be used for indicating a relation between AN resources for the UE and the PDU session to the UE via AN signaling for the UE.

Meanwhile, the N1 SM information includes a PDU Session Establishment Accept message that shall be provided to the UE by the AMF.

Multiple QoS rules may be included in the N1 SM information and the N2 SM information within the PDU Session Establishment Accept message.

The SM response message also includes information enabling the PDU session ID and AMF to determine not only which target UE to use but also which access is to be used for the UE.

11) The AMF transmits an N2 PDU Session Request message to the RAN. The message may include N2 SM information and an NAS message. The NAS message may include a PDU session ID and a PDU Session Establishment Accept message.

The AMF may transmit an NAS message including a PDU session ID and a PDU Session Establishment Accept message. Additionally, the AMF may include the N2 SM information received from the SMF in the N2 PDU Session Request message and may then transmit the message including the N2 SM information to the RAN.

12) The RAN may perform a specific signaling exchange with a UE being related to the information received from the SMF.

The RAN also allocates RAN N3 tunnel information for the PDU session.

The RAN forwards the NAS message, which is provided in Process 10. The NAS message may include a PDU session ID and N1 SM information. The N1 SM information may include a PDU Session Establishment Accept message.

The RAN transmits the NAS message to the UE only in a case where a needed RAN resource is configured and allocation of RAN tunnel information is successful.

13) The RAN transmits an N2 PDU Session Response message to the AMF. The message may include a PDU session ID, a cause, and N2 SM information. The N2 SM information may include a PDU session ID, (AN) tunnel information, and a list of allowed/rejected QoS profiles.

The RAN tunnel information may correspond to an access network address of an N3 tunnel corresponding to the PDU session.

14) The AMF may transmit an SM Request message to the SMF. The SM Request message may include N2 SM information. Herein, the AMF may forward the N2 SM information received from the RAN to the SMF.

15a) In an N4 session for the PDU session has not already been configured, the SMF may start an N4 Session Establishment procedure along with the UPF. Otherwise, the SMF may use the UPF to start an N4 Session Modification procedure. The SMF may provide AN tunnel information and CN tunnel information. The CN tunnel information shall be provided only in a case where the SMF selects the CN tunnel information in Process 8.

15b) The UPF may transmit an N4 Session Establishment/Modification Response message to the SMF.

16) The SMF may transmit an SM Response message to the AMF. When this process is ended (or completed), the AMF may forward the related event to the SMF. This occurs during a handover, in which the RAN tunnel information is modified or the AMF is re-deployed.

17) The SMF transmits information to the UE through the UPF. More specifically, in case of PDU Type IPv6, the SMF may generate an IPv6 Router Advertisement and may transmit the generated advertisement to the UE through the N4 and UPF.

18) In case the PDU Session Establishment Request is caused by a handover between the 3GPP access and the non-3GPP access, i.e., if the Request type is configured as an "existing PDU session", the SMF releases the user plane through a source access (3GPP or non-3GPP access).

19) In case the ID of the SMF is not included in Process 4b by the UDM of the DNN subscription context, the SMF may call (or page or summon) a "UDM Register UE serving NF service" including an SMF address and DNN. The UDM may store the ID, address, and DNN of the SMF.

During the procedure, if the PDU Session Establishment is not successful, the SMF notifies this to the AMF.

Figure 9:
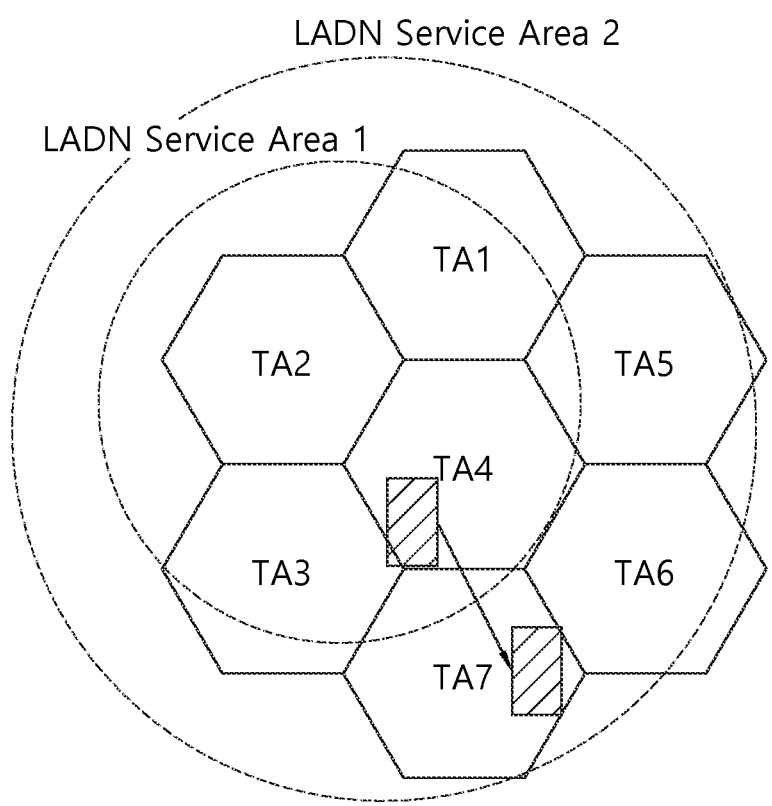
FIG. 9 shows an example of a LADN being changed.

FIG. 9 shows an example of a LADN being changed.

A network may provide a specific service for a specific area to a UE based on a LADN area (or service area) and DNN included in the LADN. In case the UE is subscribed to a service that is provided only in LADN Service Area 1, and if the UE has moved to LADN Service Area 1, the UE may perform PDU session establishment and may then be provided with the service.

However, if the UE, which has been provided with the service in LADN Service Area 1, moves to LADN Service Area 2, the UE can no longer be provided with the corresponding service. At this point, if the UE requests a PDU session establishment in order to be provided with the service, the network rejects the request.

A LADN area that provides services may be changed due to a change in service provider policy or subscriber information of the UE.

1. In case the change occurs due to a service provider policy related to the LADN:

Although the subscriber information of the UE has not been changed, in case service information related to LADN (LADN related service provided by the network) is changed by the service provider policy, the LADN area providing service may be changed.

For example, referring to FIG. 9, in case the UE is located in TA4, which corresponds to LADN Service Area 1, the UE may use a first service (Service 1), which is provided in LADN Service Area 1. In case the UE moves to TA7, which only corresponds to LADN Service Area 2 and does not correspond to LADN Service Area 1, the UE cannot use the first service (Service 1). However, due to the service provider policy of the network, in case the area providing the first service (Service 1) is expanded to LADN Service Area 2, the UE may use the first service (Service 1) even if the UE is located in TA7, which corresponds to LADN Service Area 2.

Alternatively, although it is not shown in FIG. 9, in case the UE is located in TA7, which corresponds to LADN Service Area 2, the UE may use a second service (Service 2), which is provided in LADN Service Area 2. However, due to the service provider policy of the network, in case the area providing the second service (Service 2) is changed from LADN Service Area 2 to LADN Service Area 1, even though the UE is located in TA7, which corresponds to LADN Service Area 2, the UE cannot continue to use the second service (Service 2).

Alternatively, although it is not shown in FIG. 9, in case the UE is located in TA4, which corresponds to LADN Service Area 1, the UE may use a third service (Service 3), which is provided in LADN Service Area 1. However, due to the service provider policy of the network, in case the area providing the third service (Service 3) is changed from LADN Service Area 1 including TA1, TA2, TA3, and TA4 to LADN Service Area 1 including only TA1, TA2, and TA3, the UE being located in TA4 cannot continue to use the third service (Service 3).

2. In case subscriber information related to the LADN area is changed:

In case the UE has instantly changed its subscriber information related to the LADN area, the network shall update the changed subscriber information and shall process the service request of the UE by applying the updated subscriber information and. The change may include new addition, deletion, and update (or renewal). The occurrence of a change in the LADN-related subscriber information may denote that LADN area information and LADN DNN information have been changed.

That is, in case a LADN area providing services is changed to a different LADN area, due to policy of a network system or subscriber information, the UE may not recognize the change in the LADN area and may transmit a PDU session establishment/modification request for the old LADN area. As described above, in case the network system rejects the PDU session establishment/modification request of the UE, a problem may occur in the operations of the UE.

According to the related art, even if a Reject message is received from the network system, the UE may re-transmit a PDU session establishment/modification request for the rejected LADN area to the network system, and the network system may re-reject the UE's request. In this case, unnecessary signaling may occur between the UE and the network system.

Additionally, according to the related art, a Session Management Function (SMF) within the network system rejects the UE's request, and, in this case, unnecessary signaling may occur between the SMF and an Access and Mobility Management Function (AMF).

Therefore, in this specification, in order to enhance the unnecessary signaling between the UE and the network system or within the network system, a method for processing information on a LADN area will be proposed.

<Disclosure of this Specification>

I. Proposal 1: SMF is in Charge of Updating Information on the LADN Area

Figure 10:
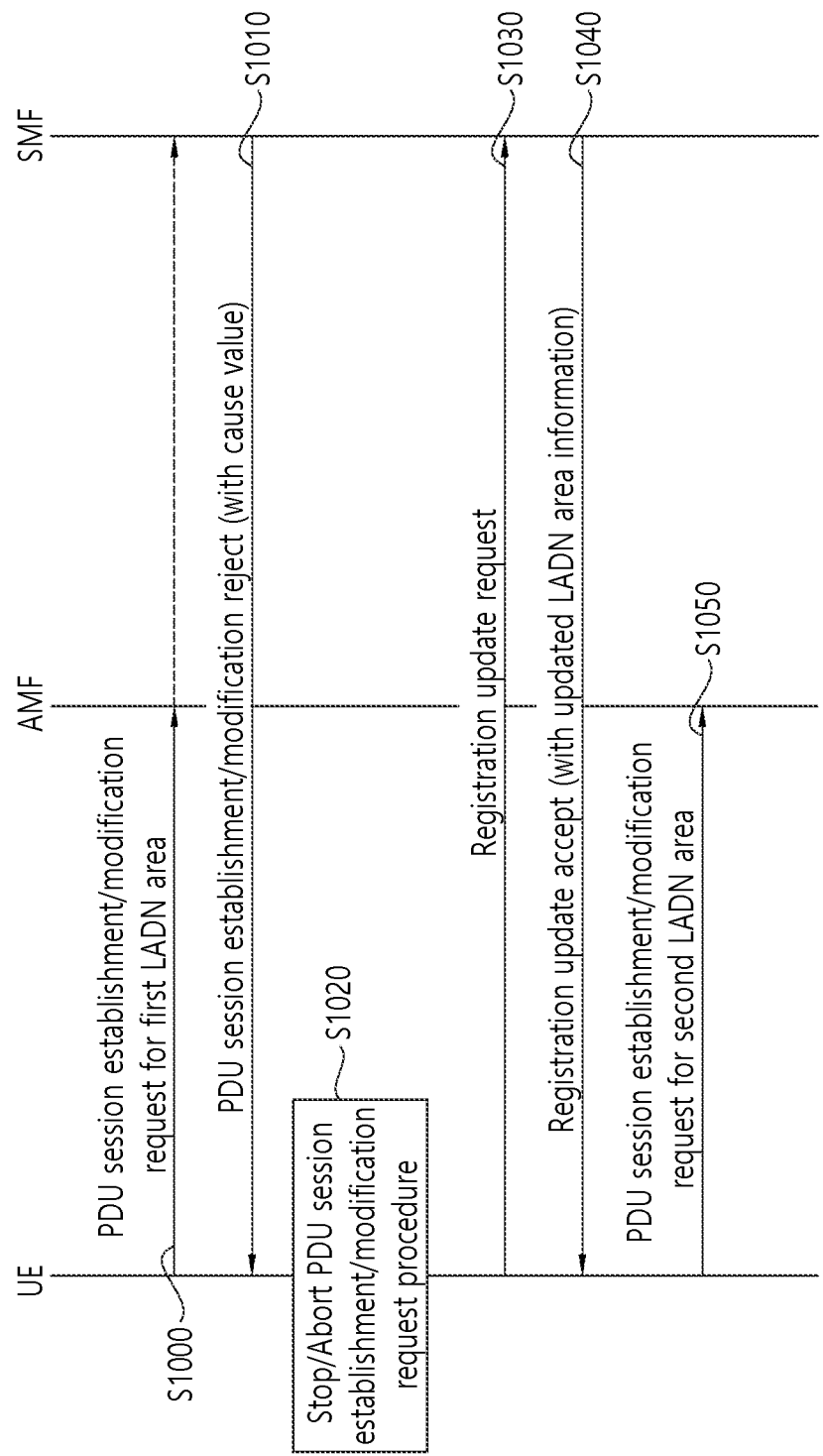
FIG. 10 shows operations of a UE and SMF when a LADN is changed according to an embodiment of Proposal 1.

FIG. 10 shows operations of a UE and SMF when a LADN is changed according to an embodiment of Proposal 1.

Referring to FIG. 10, a UE may transmit a PDU session establishment/modification request for LADN Service Area 1 to a network system (S1000).

If the UE transmits a PDU session establishment/modification request for LADN Service Area 1 to the network system outside of LADN Service Area 1, an SMF may reject the PDU session establishment/modification request (S1010). The SMF may transmit a Reject message indicating the Reject for the PDU session establishment/modification request to the UE. The Reject message may include a cause value indicating the Reject reason. The cause value may indicate that the reason of the Reject is that the PDU session establishment/modification request for LADN Service Area 1 has been transmitted outside of LADN Service Area 1.

In case the Reject message is received from the SMF, the UE may stop/abort the PDU session establishment/modification request for LADN Service Area 1 (S1020). Additionally, the UE may perform a registration update request procedure for synchronizing the LADN area between the UE and the network system. In order to perform the registration update request procedure, the UE may transmit a registration update request to the SMF (S1030).

In case the registration update request is received from the UE, the SMF may transmit a registration update accept to the UE (S1040). The registration update accept may include information on the updated LADN area (e.g., LADN Service Area 2).

The UE may perform a PDU session establishment/modification request procedure based on information on the updated LADN area, which is received from the SMF (S1050). That is, based on the information on LADN Service Area 2, which is received from the SMF, the UE may re-transmit the PDU session establishment/modification request for LADN Service Area 2 to the SMF.

Figure 11:
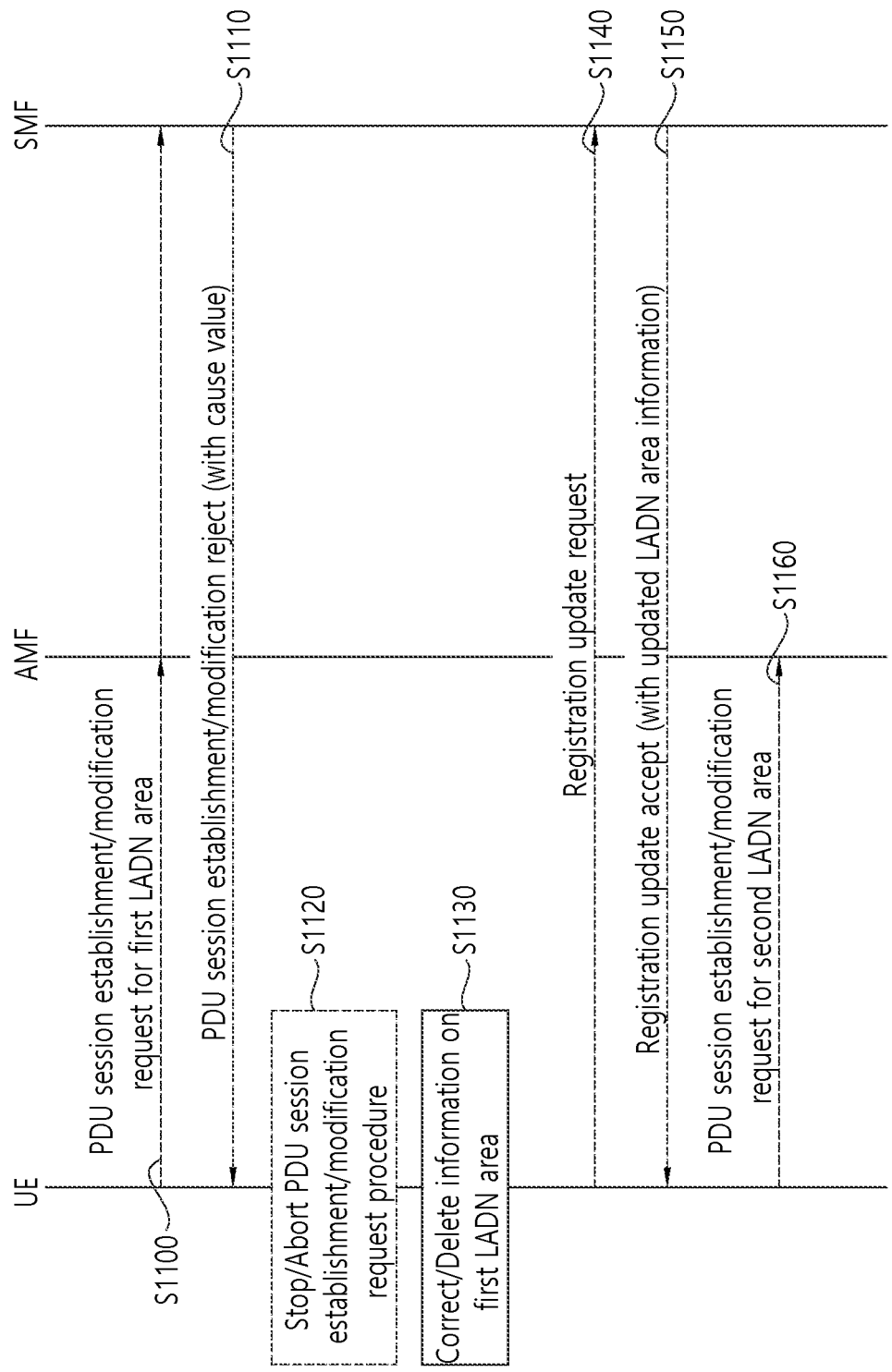
FIG. 11 shows operations of a UE and SMF when a LADN is changed according to another embodiment of Proposal 1.

FIG. 11 shows operations of a UE and SMF when a LADN is changed according to another embodiment of Proposal 1.

Referring to FIG. 11, a UE may transmit a PDU session establishment/modification request for LADN Service Area 1 to a network system (S1100).

If the UE transmits a PDU session establishment/modification request for LADN Service Area 1 to the network system outside of LADN Service Area 1, an SMF may reject the PDU session establishment/modification request (S1110). The SMF may transmit a Reject message indicating the Reject for the PDU session establishment/modification request to the UE. The Reject message may include a cause value indicating the Reject reason. The cause value may indicate that the reason of the Reject is that the PDU session establishment/modification request for LADN Service Area 1 has been transmitted outside of LADN Service Area 1.

In case the Reject message is received from the SMF, the UE may stop/abort the PDU session establishment/modification request for LADN Service Area 1 (S1120). If the Reject message is received from the SMF, the UE may recognize that the information on the LADN area being configured/stored in the network system is different from the information on the LADN area being configured/stored in the UE itself. Therefore, in case the UE receives the Reject message from the SMF, the UE may correct/delete the information on LADN Service Area 1 that was previously stored (S1130). The information on LADN Service Area 1 may be a Tracking Area Identifier (TAI) list.

The UE may not perform the PDU session establishment/modification request procedure once again for the deleted LADN Service Area 1.

The UE may perform a registration update request procedure for synchronizing the LADN area between the UE and the network system. In order to perform the registration update request procedure, the UE may transmit a registration update request to the SMF (S1140).

In case the registration update request is received from the UE, the SMF may transmit a registration update accept to the UE (S1150). The registration update accept may include information on the updated LADN area (e.g., LADN Service Area 2).

The UE may perform a PDU session establishment/modification request procedure based on information on the updated LADN area, which is received from the SMF (S1160). That is, based on the information on LADN Service Area 2, which is received from the SMF, the UE may re-transmit the PDU session establishment/modification request for LADN Service Area 2 to the SMF.

Figure 12:
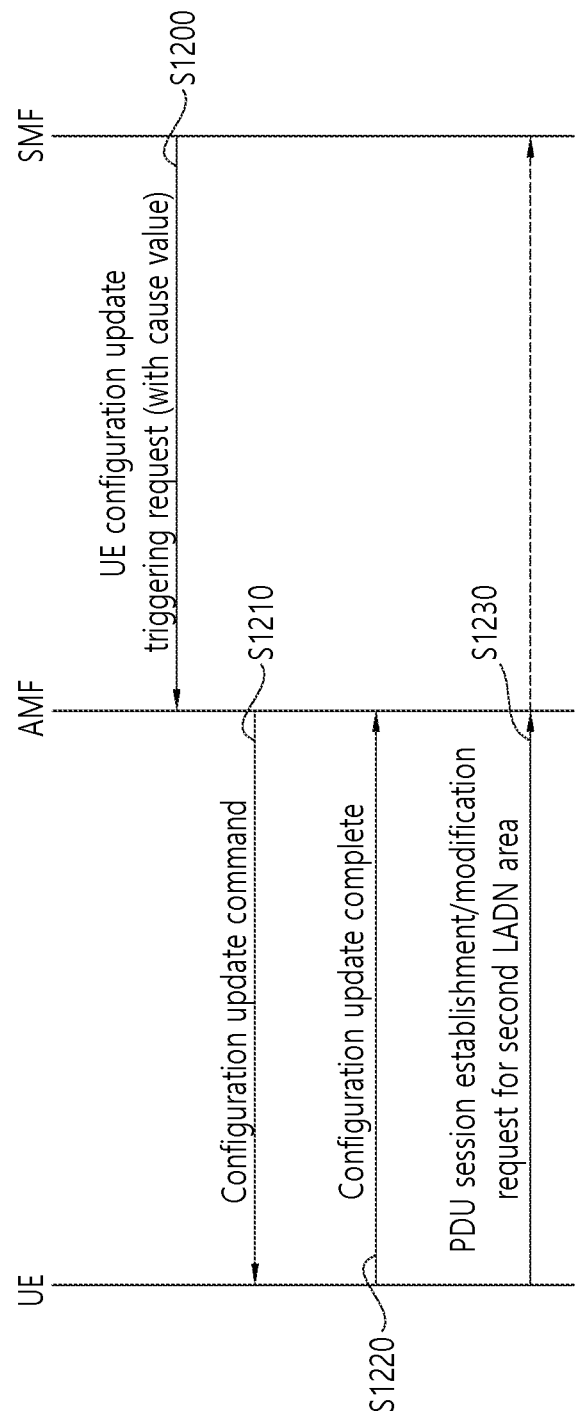
FIG. 12 shows operations of a UE and SMF when a LADN is changed according to another embodiment of Proposal 1.

FIG. 12 shows operations of a UE and SMF when a LADN is changed according to another embodiment of Proposal 1.

Referring to FIG. 12, the SMF may request, to the AMF, to trigger a UE Configuration Update procedure (S1200). At this point, as a request reason, the request may include a cause value. The cause value may be information indicating that the UE is outside of the LADN area or information indicating an update of the LADN area.

The AMF may transmit a Configuration Update Command message to the UE (S1210). The Configuration Update Command message may include information on the updated LADN area.

After updating the information on the LADN area, as an acknowledgement of the reception of the Configuration Update Command message, the UE may transmit a Configuration Update Complete message to the network system (S1220).

The UE may perform the PDU session establishment/modification request procedure based on the information on the updated LADN area, which is received from the SMF or AMF (S1230). That is, based on the information on LADN Service Area 2, which is received from the SMF or AMF, the UE may re-transmit the PDU session establishment/modification request for the LADN Service Area 2 to the SMF.

The transmission of the Configuration Update Command message, by the AMF, to the UE may be performed before the SMF rejects the request of the UE (S1010 of FIG. 10 or S1110 of FIG. 11) or after the SMF rejects the request of the UE.

Proposal 2: AMF is in Charge of Updating Information on the LADN Area

Figure 13:
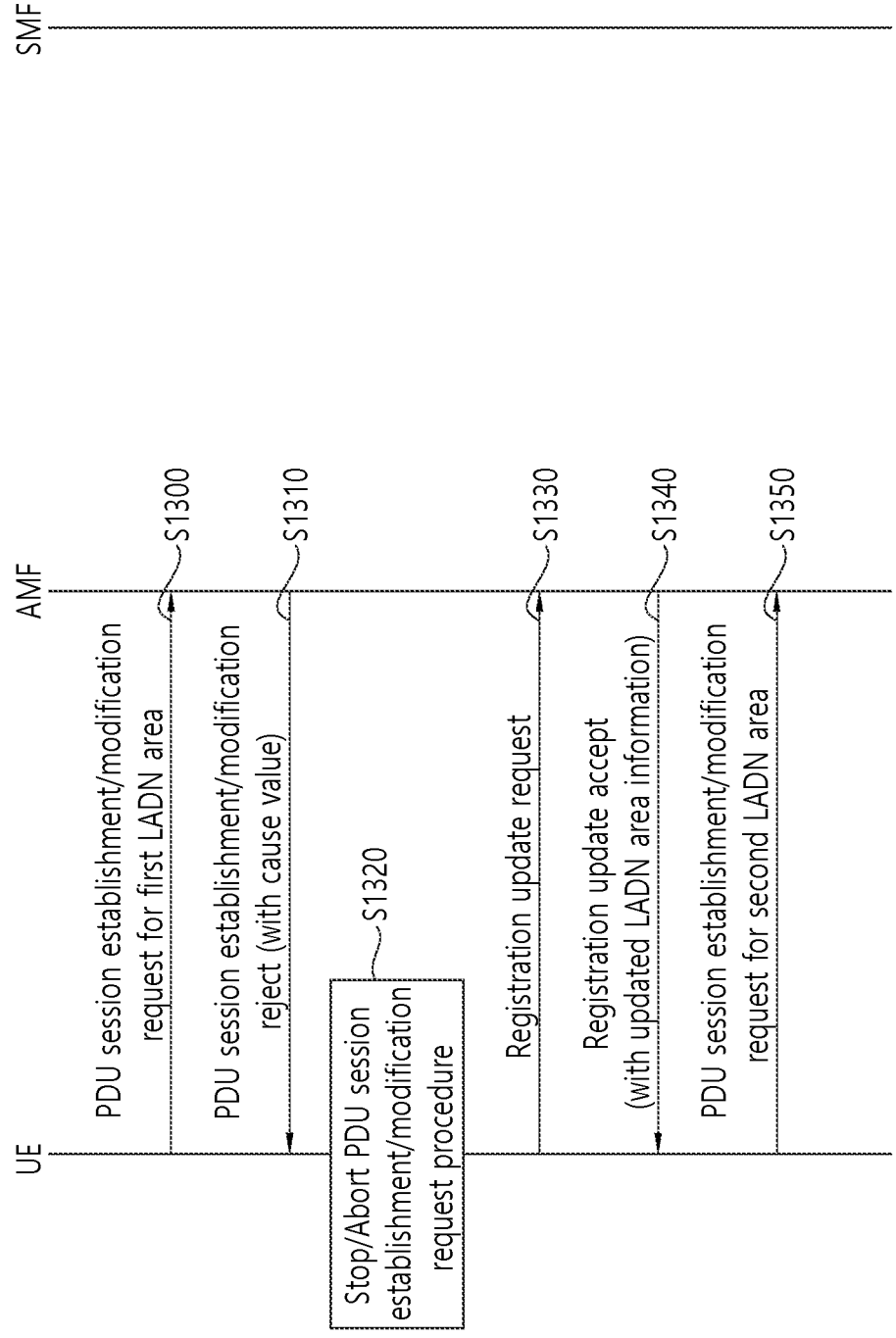
FIG. 13 shows operations of a UE and AMF when a LADN is changed according to an embodiment of Proposal 2.

FIG. 13 shows operations of a UE and AMF when a LADN is changed according to an embodiment of Proposal 2.

Referring to FIG. 13, a UE may transmit a PDU session establishment/modification request for LADN Service Area 1 to a network system (S1300).

If the UE transmits a PDU session establishment/modification request for LADN Service Area 1 to the network system outside of LADN Service Area 1, an AMF may reject the PDU session establishment/modification request (S1310). The AMF may determine whether or not the UE is inside the LADN area or outside of the LADN area, and the AMF may also determine whether or not a Data Network Name (DNN) for the PDU session establishment/modification request is a DNN of LADN Service Area 1. Therefore, instead of the SMF, the AMF may transmit a Reject message indicating the Reject for the PDU session establishment/modification request to the UE. The Reject message may include a cause value indicating the Reject reason. The cause value may indicate that the reason of the Reject is that the PDU session establishment/modification request for LADN Service Area 1 has been transmitted outside of LADN Service Area 1.

In case the Reject message is received from the AMF, the UE may stop/abort the PDU session establishment/modification request for LADN Service Area 1 (S1320). Additionally, the UE may perform a registration update request procedure for synchronizing the LADN area between the UE and the network system. In order to perform the registration update request procedure, the UE may transmit a registration update request to the AMF (S1330).

In case the registration update request is received from the UE, the AMF may transmit a registration update accept to the UE (S1340). The registration update accept may include information on the updated LADN area (e.g., LADN Service Area 2).

The UE may perform a PDU session establishment/modification request procedure based on information on the updated LADN area, which is received from the AMF (S1350). That is, based on the information on LADN Service Area 2, which is received from the AMF, the UE may re-transmit the PDU session establishment/modification request for LADN Service Area 2 to the AMF.

Figure 14:
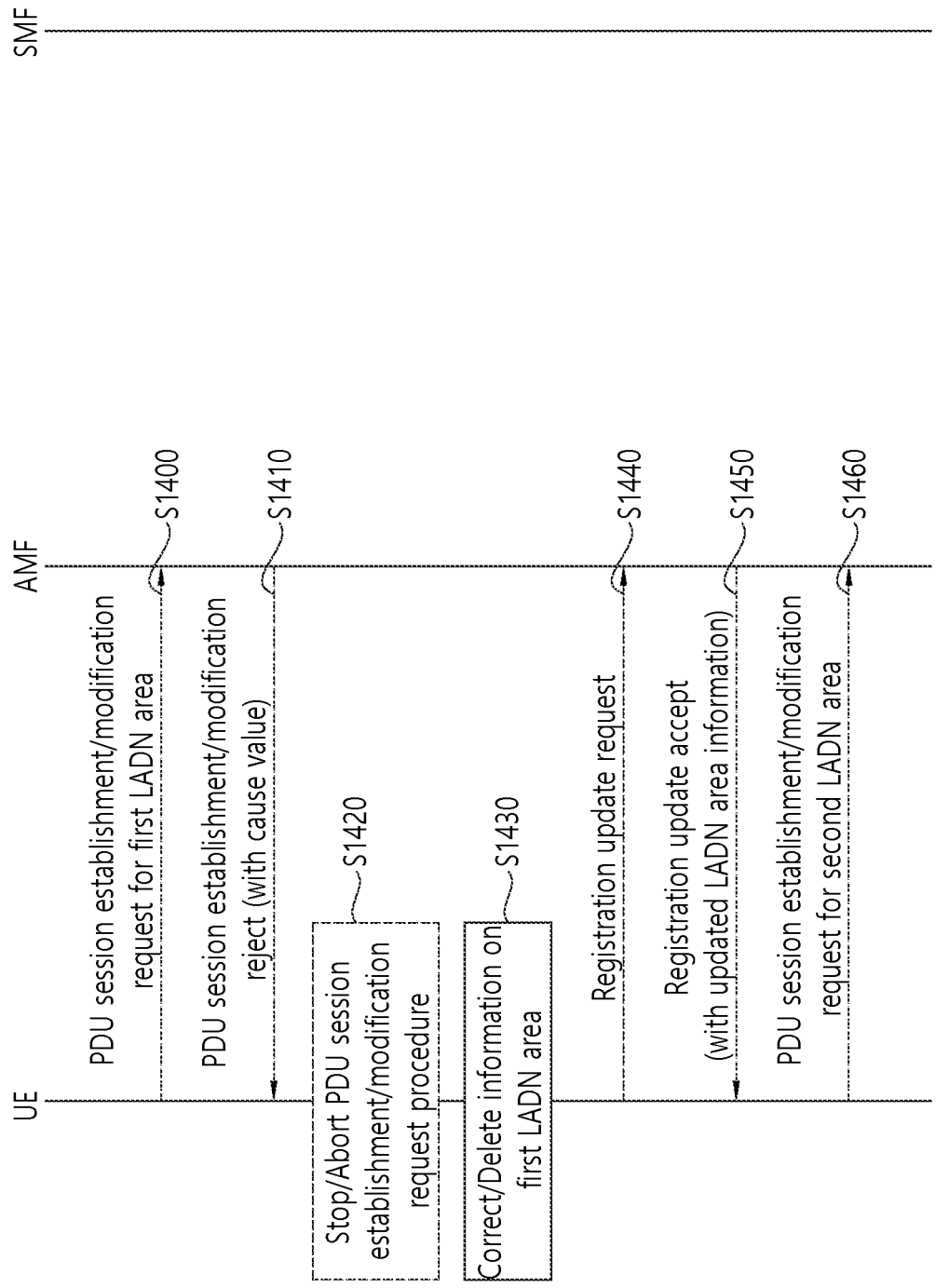
FIG. 14 shows operations of a UE and AMF when a LADN is changed according to another embodiment of Proposal 2.

FIG. 14 shows operations of a UE and AMF when a LADN is changed according to another embodiment of Proposal 2.

Referring to FIG. 14, a UE may transmit a PDU session establishment/modification request for LADN Service Area 1 to a network system (S1400).

If the UE transmits a PDU session establishment/modification request for LADN Service Area 1 to the network system outside of LADN Service Area 1, an AMF may reject the PDU session establishment/modification request (S1410). The AMF may determine whether or not the UE is inside the LADN area or outside of the LADN area, and the AMF may also determine whether or not a Data Network Name (DNN) for the PDU session establishment/modification request is a DNN of LADN Service Area 1. Therefore, instead of the SMF, the AMF may transmit a Reject message indicating the Reject for the PDU session establishment/modification request to the UE. The Reject message may include a cause value indicating the Reject reason. The cause value may indicate that the reason of the Reject is that the PDU session establishment/modification request for LADN Service Area 1 has been transmitted outside of LADN Service Area 1.

In case the Reject message is received from the AMF, the UE may stop/abort the PDU session establishment/modification request for LADN Service Area 1 (S1420). If the Reject message is received from the AMF, the UE may recognize that the information on the LADN area being configured/stored in the network system is different from the information on the LADN area being configured/stored in the UE itself. Therefore, in case the UE receives the Reject message from the AMF, the UE may correct/delete the information on LADN Service Area 1 that was previously stored (S1430). The information on LADN Service Area 1 may be TAI (Tracking Area Identifier) list.

The UE may not perform the PDU session establishment/modification request procedure once again for the deleted LADN Service Area 1.

The UE may perform a registration update request procedure for synchronizing the LADN area between the UE and the network system. In order to perform the registration update request procedure, the UE may transmit a registration update request to the AMF (S1440).

In case the registration update request is received from the UE, the AMF may transmit a registration update accept to the UE (S1450). The registration update accept may include information on the updated LADN area (e.g., LADN Service Area 2).

The UE may perform a PDU session establishment/modification request procedure based on information on the updated LADN area, which is received from the AMF (S1460). That is, based on the information on LADN Service Area 2, which is received from the AMF, the UE may re-transmit the PDU session establishment/modification request for LADN Service Area 2 to the AMF.

Figure 15:
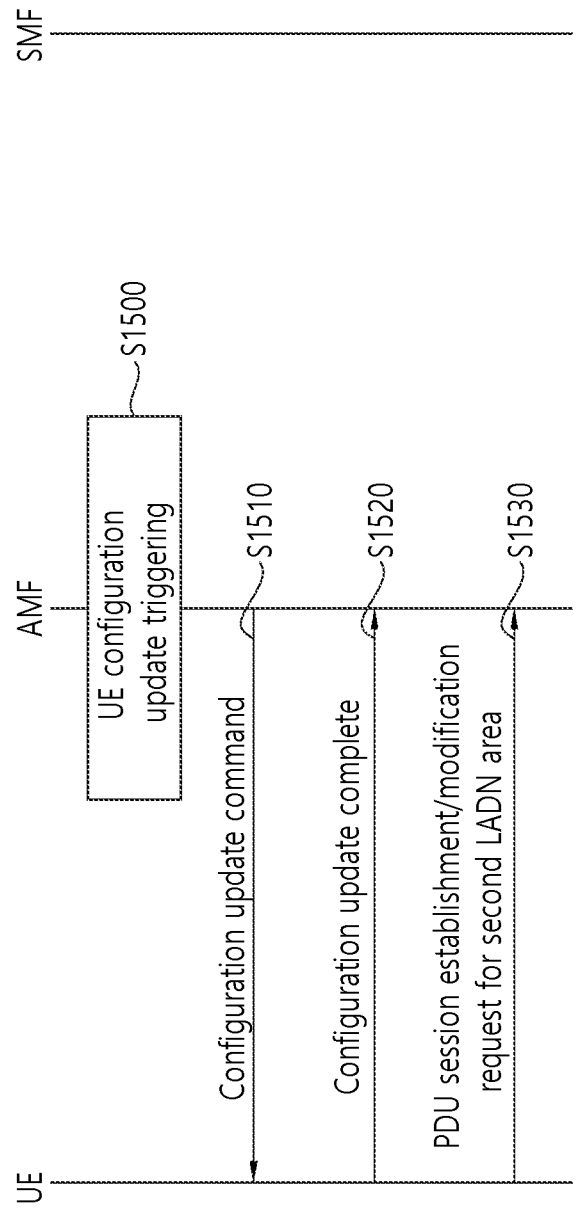
FIG. 15 shows operations of a UE and AMF when a LADN is changed according to another embodiment of Proposal 2.

FIG. 15 shows operations of a UE and AMF when a LADN is changed according to another embodiment of Proposal 2.

Referring to FIG. 15, the AMF may trigger a UE Configuration Update procedure (S1500).

Due to the triggering of the UE Configuration update procedure, the AMF may transmit a Configuration Update Command message to the UE (S1510). The Configuration Update Command message may include information on the updated LADN area.

After updating the information on the LADN area, as an acknowledgement of the reception of the Configuration Update Command message, the UE may transmit a Configuration Update Complete message to the network system (S1520).

The UE may perform the PDU session establishment/modification request procedure based on the information on the updated LADN area, which is received from the AMF (S1530). That is, based on the information on LADN Service Area 2, which is received from the AMF, the UE may re-transmit the PDU session establishment/modification request for the LADN Service Area 2 to the SMF.

The transmission of the Configuration Update Command message, by the AMF, to the UE may be performed before the AMF rejects the request of the UE (S1310 of FIG. 13 or S1410 of FIG. 14) or after the AMF rejects the request of the UE.

Figure 16:
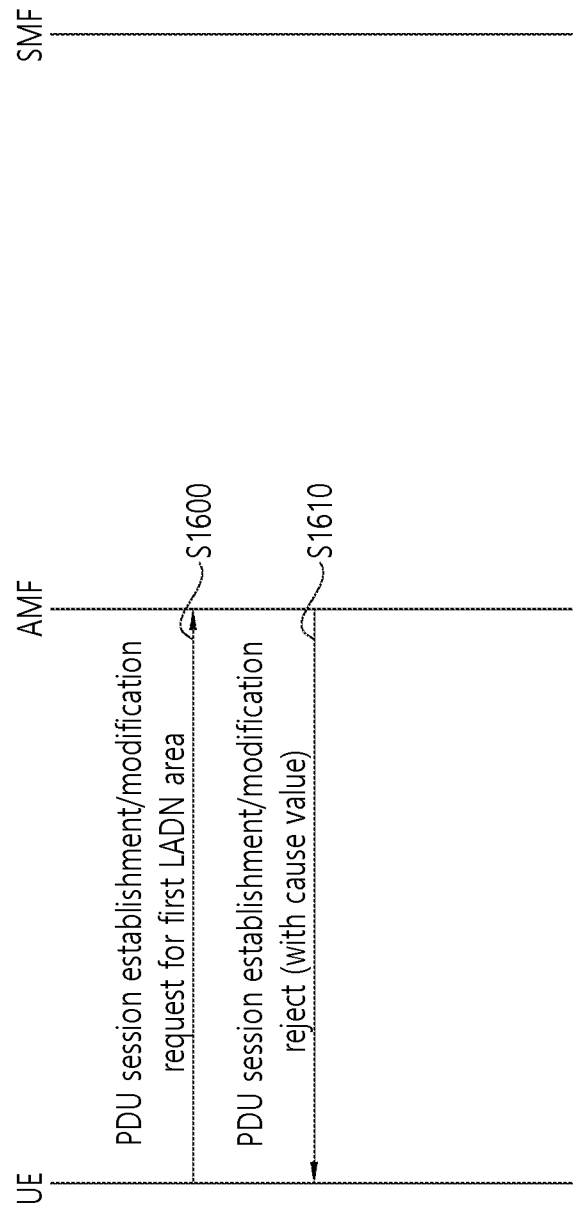
FIG. 16 shows operations of a UE and AMF when a LADN is changed according to another embodiment of Proposal 2.

FIG. 16 shows operations of a UE and AMF when a LADN is changed according to another embodiment of Proposal 2.

Referring to FIG. 16, a UE may transmit a PDU session establishment/modification request for LADN Service Area 1 to a network system (S1600).

If the UE transmits a PDU session establishment/modification request for LADN Service Area 1 to the network system outside of LADN Service Area 1, an AMF may reject the PDU session establishment/modification request (S1610). The AMF may determine whether or not the UE is inside the LADN area or outside of the LADN area, and the AMF may also determine whether or not a Data Network Name (DNN) for the PDU session establishment/modification request is a DNN of LADN Service Area 1. Therefore, instead of the SMF, the AMF may transmit a Reject message indicating the Reject for the PDU session establishment/modification request to the UE. The Reject message may include a cause value indicating the Reject reason. The cause value may indicate that the reason of the Reject is that the PDU session establishment/modification request for LADN Service Area 1 has been transmitted outside of LADN Service Area 1.

The Reject message is included in a payload container and may then be transmitted to the UE through a downlink (DL) NAS TRANSPORT message.

Figure 17:
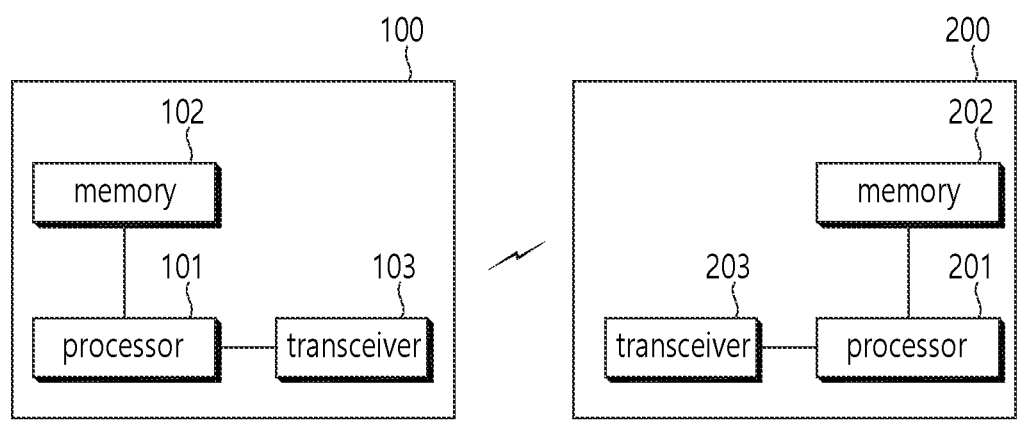
FIG. 17 is a block diagram showing a wireless communication system in which an embodiment proposed in this specification is implemented.

FIG. 17 is a block diagram showing a wireless communication system in which an embodiment proposed in this specification is implemented.

A base station (200) includes a processor (201), a memory (202), and a radio frequency (RF) unit (203). The memory (202) is connected to the processor (201) and stores various information for operating the processor (201). The RF unit (203) is connected to the processor (201) and transmits and/or receives radio signals. The processor (201) implements the proposed function(s), process(es), and/or method(s). In the above-described embodiment, operations of the base station may be implemented by the processor (201).

A wireless device (100) includes a processor (101), a memory (102), and an RF unit (103). The memory (102) is connected to the processor (101) and stores various information for operating the processor (101). The RF unit (103) is connected to the processor (101) and transmits and/or receives radio signals. The processor (101) implements the proposed function(s), process(es), and/or method(s). In the above-described embodiment, operations of the wireless device may be implemented by the processor (101).

The processor may include an application-specific integrated circuit (ASIC), another chip set, a logical circuit, and/or a data processing device. The memory may include a read-only memory (ROM), a random access memory (RAM), a flash memory, a memory card, a storage medium, and/or another storage device. The RF unit may include a baseband circuit for processing radio signals. When the embodiment is implemented as software, the above-described method may be implemented as a module (process, function, and so on) performing the above-described function. The module may be stored in the memory and may be executed by the processor. The memory may be located inside or outside of the processor, and the memory may be connected to the processor by various well-known means.

In the above-described exemplary system, although the methods have been described based on the flowcharts using a series of the steps or blocks, this specification will not be limited to the order (or sequence) of the steps, and some steps may be performed according to an order (or sequence) that is different from the above-described steps or may be performed simultaneously with the steps. Furthermore, it shall be understood by those skilled in the art that the steps shown in the flowcharts are not exclusive and may include other steps or one or more steps of the flowcharts may be deleted without affecting the scope of this specification.

Figure 18:
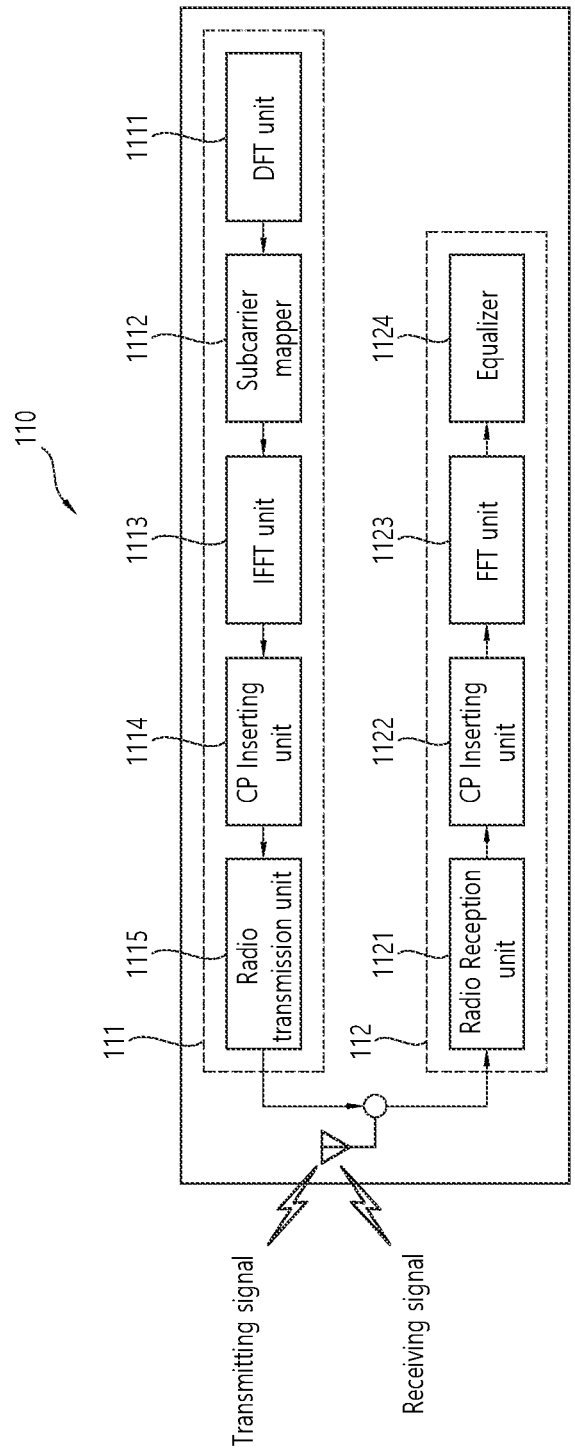
FIG. 18 is a detailed block diagram of a transceiver included in the wireless device shown in FIG. 17.

FIG. 18 is a detailed block diagram of a transceiver included in the wireless device shown in FIG. 17.

Referring to FIG. 18, the transceiver (110) includes a transmitter (111) and a receiver (112). The transmitter (111) includes a Discrete Fourier Transform (DFT) unit (1111), a subcarrier mapper (1112), an Inverse Fast Fourier Transform (IFFT) unit (1113), a CP inserter (1114), a radio transmitter (1115). The transmitter (111) may further include a modulator. Also, for example, the transmitter (111) may further include a scramble unit (not shown), a modulation mapper (not shown), a layer mapper (not shown), and a layer permutator (not shown), and these blocks may be positioned before the DFT unit (1111). More specifically, in order to prevent an increase in the peak-to-average power ratio (PAPR), the transmitter (111) allows information to pass through the DFT unit (1111) beforehand prior to mapping a signal to a subcarrier. After performing subcarrier mapping, a signal that is spread (or precoded, in the same sense) by the DFT unit (1111) through the subcarrier mapper (1112), a signal within a time axis is generated (or created) after the processed signal passes through the Inverse Fast Fourier Transform (IFFT) unit (1113).

The DFT unit (1111) performs DFT on the inputted symbols, thereby outputting complex number symbols (complex-valued symbols). For example, if Ntx symbols are inputted (wherein Ntx is an integer), a DFT size is equal to Ntx. The DFT unit (1111) may also be referred to as a transform precoder. The subcarrier mapper (1112) maps the complex number symbols to each subcarrier of the frequency domain. The complex number symbols may be mapped to resource elements corresponding to resource blocks being assigned for data transmission. The subcarrier mapper (1112) may also be referred to as a resource element mapper. The IFFT unit (1113) performs IFFT on the inputted symbols, thereby outputting a baseband signal for data, which correspond to a time domain signal. The CP inserter (1114) duplicates (or copies) an end part of the baseband signal for the data and inserts the duplicated part to a front part of the baseband signal for the data. By performing CP insertion, Inter-Symbol Interference (ISI) and Inter-Carrier Interference (ICI) may be prevented, thereby allowing orthogonality to be maintained even in a multi-path channel.

Meanwhile, the receiver (112) includes a radio receiver (1121), a CP remover (1122), a Fast Fourier Transform (FFT) unit (1123), and an equalizer (1124). The radio receiver (1121), the CP remover (1122), and the FFT unit (1123) of the receiver (112) respectively perform the inverse functions of the radio transmitter (1115), the CP inserter (1114), and the IFFT unit (1113) of the transmitter (111). The receiver (112) may further include a demodulator.

What is claimed is:

1. A method for performing, by a user equipment (UE), a PDU session establishment request, the method comprising:
    transmitting a registration request message including a registration type and ID information;
    receiving a registration accept message including ID information, registration area, mobility restriction, or periodic registration update timer, as a response to the registration request message;
    transmitting a first PDU session establishment request message for a first Local Area Data Network (LADN) area;
    receiving a PDU session establishment reject message rejecting the first PDU session establishment request from a network system,
    wherein the PDU session establishment reject message includes a cause value "out of LADN service area";
    based on that the cause value is received, transmitting a registration update request for updating a LADN area;
    receiving information related to an updated second LADN area as a response to the registration update request; and
    transmitting a second PDU session establishment request message for the second LADN area,
    based on that the cause value is received, a PDU session establishment procedure based on the first PDU session establishment request message is stopped/aborted, and
    based on that the cause value is received, information related to the first LADN area is deleted, in order to not perform a PDU session establishment request again for the first LADN area.

2. The method of claim 1, wherein the information on the second LADN area is included in a registration update accept message.

3. The method of claim 1, further comprising:
    receiving a Configuration Update Command message from an Access and Mobility Management Function (AMF) node of the network system,
    wherein the Configuration Update Command is triggered by a request made by a Session Management Function (SMF) node of the network system, and
    wherein the information on the second LADN area is included in the Configuration Update Command.

4. The method of claim 1, wherein the network system is a Session Management Function (SMF) node or an Access and Mobility Management Function (AMF) node.

5. A user equipment (UE) configured to perform a PDU session establishment request, the user equipment comprising:
- a transceiver transmitting and/or receiving signals; and
- a processor controlling the transceiver,
- wherein the processor is configured to:
- transmit a registration request message including a registration type and ID information;
- receive a registration accept message including ID information, registration area, mobility restriction, or periodic registration update timer, as a response to the registration request message;
- transmit a first PDU session establishment request message for a first LADN area;
- receive a PDU session establishment reject message rejecting the first PDU session establishment request from a network system,
- wherein the PDU session establishment reject message includes a cause value "out of LADN service area";
- based on that the cause value is received, transmitting a registration update request for updating a LADN area;
- receive information related to an updated second LADN area as a response to the registration update request; and
- transmit a second PDU session establishment request message for the second LADN area,
- based on that the cause value is received, a PDU session establishment procedure based on the first PDU session establishment request message is stopped/aborted, and
- based on that the cause value is received, information related to the first LADN area is deleted, in order to not perform a PDU session establishment request again for the first LADN area.

6. The user equipment of claim 5, wherein the information on the second LADN area is included in a registration update accept message.

7. The user equipment of claim 5, wherein the processor receives a Configuration Update Command message from an Access and Mobility Management Function (AMF) node of the network system,
- wherein the Configuration Update Command is triggered by a request made by a Session Management Function (SMF) node of the network system, and
- wherein the information on the second LADN area is included in the Configuration Update Command.

8. The user equipment of claim 5, wherein the network system is a Session Management Function (SMF) node or an Access and Mobility Management Function (AMF) node.

* * * * *